(12) United States Patent
Chen et al.

(10) Patent No.: US 10,593,468 B2
(45) Date of Patent: Mar. 17, 2020

(54) INDUCTIVE POWER TRANSFER ASSEMBLY

(71) Applicant: Apple Inc., Cupertino, CA (US)

(72) Inventors: Liang Chen, Auckland (NZ); Saining Ren, Auckland (NZ)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/134,812

(22) Filed: Sep. 18, 2018

(65) Prior Publication Data

US 2019/0311848 A1 Oct. 10, 2019

Related U.S. Application Data

(60) Provisional application No. 62/653,406, filed on Apr. 5, 2018.

(51) Int. Cl.
*H02J 7/00* (2006.01)
*H01F 27/34* (2006.01)
(Continued)

(52) U.S. Cl.
CPC .......... *H01F 27/346* (2013.01); *H01F 27/06* (2013.01); *H01F 27/24* (2013.01); *H01F 27/28* (2013.01);
(Continued)

(58) Field of Classification Search
CPC ........ H01F 27/346; H01F 27/06; H01F 27/24; H01F 27/28; H02J 50/12; H02J 7/0042; H02J 7/025
See application file for complete search history.

(56) References Cited

U.S. PATENT DOCUMENTS 5,000,178 A 3/1991 Griffith
5,293,308 A 3/1994 Boys et al.
(Continued)

FOREIGN PATENT DOCUMENTS

CN 101461114 6/2009
CN 103474213 A 12/2013
(Continued)

OTHER PUBLICATIONS

Budhia, et al., "Develpoment of a Single-Sided Flux Magnetic Coupler for Electric Vehicle IPT Charging Systems", IEEE Transactions on Industrial Electronics, vol. 60, No. 1, Jan. 1, 2013 (Jan. 1, 2013), pp. 318-328, XP002781664, DOI: 10.1109/TIE.2011.2179274, p. 325.

(Continued)

*Primary Examiner* — Arun C Williams
(74) *Attorney, Agent, or Firm* — Blank Rome LLP

(57) ABSTRACT

An inductive power transfer assembly comprising a magnetic core having a base portion, a first limb, and a second limb, wherein the first limb and the second limb extend, in a direction, from a surface of the base portion a first power transfer coil and a second power transfer coil, wherein the first power transfer coil is wound about the first limb, and wherein the second power transfer coil is wound about the second limb; and inverter circuitry connected to the first power transfer coil and the second power transfer coil, wherein the inverter circuitry, during operation, causes the first power transfer coil and the second power transfer coil to generate flux having opposing polarity.

32 Claims, 16 Drawing Sheets

(51) Int. Cl.
  *H02J 50/12* (2016.01)
  *H02J 7/02* (2016.01)
  *H01F 27/06* (2006.01)
  *H01F 27/24* (2006.01)
  *H01F 27/28* (2006.01)

(52) U.S. Cl.
  CPC ............ *H02J 7/0042* (2013.01); *H02J 7/025* (2013.01); *H02J 50/12* (2016.02)

(56) References Cited

U.S. PATENT DOCUMENTS

| | | |
|---|---|---|
| 5,469,036 A | 11/1995 | Eto |
| 5,496,036 A | 3/1996 | Chester |
| 5,907,231 A * | 5/1999 | Watanabe ............... H01F 38/14 320/108 |
| 6,151,231 A | 11/2000 | Saint-Pierre et al. |
| 6,320,772 B1 | 11/2001 | Doyama et al. |
| 6,483,202 B1 * | 11/2002 | Boys ...................... B60L 5/005 307/17 |
| 2005/0068019 A1 | 3/2005 | Nakamara et al. |
| 2005/0133497 A1 | 6/2005 | Makoto |
| 2005/0189910 A1 | 9/2005 | Hui |
| 2006/0214628 A1 * | 9/2006 | Chang .................... H02J 50/10 320/108 |
| 2007/0064406 A1 | 3/2007 | Beart |
| 2008/0303351 A1 * | 12/2008 | Jansen ................. A61C 1/0015 307/104 |
| 2010/0109604 A1 | 5/2010 | Boys et al. |
| 2010/0259217 A1 | 10/2010 | Baarman et al. |
| 2010/0314947 A1 | 12/2010 | Baarman et al. |
| 2011/0025133 A1 | 2/2011 | Sauerlaender et al. |
| 2011/0115429 A1 | 5/2011 | Toivola et al. |
| 2012/0223641 A1 * | 9/2012 | Chiang ................. H01F 27/306 315/70 |
| 2013/0001571 A1 | 1/2013 | Jung et al. |
| 2013/0026850 A1 | 1/2013 | Throngnumchai et al. |
| 2013/0030892 A1 | 1/2013 | Liu et al. |
| 2013/0119773 A1 | 5/2013 | Davis |
| 2014/0091755 A1 | 4/2014 | Walley et al. |
| 2014/0197687 A1 | 7/2014 | Lin |
| 2018/0336992 A1 * | 11/2018 | Hsueh ................... H01F 27/263 |

FOREIGN PATENT DOCUMENTS

| | | |
|---|---|---|
| JP | H0354103 A | 3/1991 |
| JP | H04-246331 A | 9/1992 |
| JP | H06-277358 A | 10/1994 |
| JP | H06277358 | 10/1994 |
| JP | H08-37121 A | 2/1996 |
| JP | H08-126229 A | 5/1996 |
| JP | 2846090 B2 | 1/1999 |
| JP | H11-97263 A | 4/1999 |
| JP | 2000269059 A | 9/2000 |
| JP | 2001044054 | 2/2001 |
| JP | 2002246248 | 8/2002 |
| JP | 2003141466 A | 5/2003 |
| JP | 2004281814 A | 10/2004 |
| JP | 2005525705 A | 8/2005 |
| JP | 2006042519 | 2/2006 |
| JP | 2006128381 | 5/2006 |
| JP | 2006245950 A | 9/2006 |
| JP | 2007505480 | 3/2007 |
| JP | 2008154446 A | 7/2008 |
| JP | 2008263740 A | 10/2008 |
| JP | 2009508331 A | 2/2009 |
| JP | 2009164293 A | 7/2009 |
| JP | 2009252970 A | 10/2009 |
| JP | 2009295930 A | 12/2009 |
| JP | 2010119187 A | 5/2010 |
| JP | 2010135701 A | 6/2010 |
| JP | 2010541531 A | 12/2010 |
| JP | 2011072188 A | 4/2011 |
| JP | 2011181769 A | 9/2011 |
| JP | 2011229360 | 11/2011 |
| JP | 2011229360 A | 11/2011 |
| JP | 2012079806 A | 4/2012 |
| JP | 2012178529 A | 9/2012 |
| KR | 100944113 | 2/2010 |
| KR | 1020100017582 | 2/2010 |
| WO | 2003105308 | 12/2003 |
| WO | 2005024865 | 3/2005 |
| WO | 2005033819 A2 | 4/2005 |
| WO | 2006059771 A1 | 6/2006 |
| WO | 200712632 | 11/2007 |
| WO | 2008137996 A1 | 11/2008 |
| WO | 2008140333 | 11/2008 |
| WO | 2009037821 A1 | 3/2009 |
| WO | 2009045847 A2 | 4/2009 |
| WO | 2010036980 A1 | 4/2010 |
| WO | 2010090539 | 8/2010 |
| WO | 2010090539 A1 | 8/2010 |
| WO | 2010118191 A1 | 11/2010 |
| WO | 2011006842 A2 | 1/2011 |
| WO | 2011016736 | 2/2011 |
| WO | 2011016737 | 2/2011 |
| WO | 2011016737 A1 | 2/2011 |
| WO | 2011074091 A1 | 6/2011 |
| WO | 2011145953 A1 | 11/2011 |
| WO | 2012040548 A1 | 3/2012 |
| WO | 2013036146 A1 | 3/2013 |
| WO | 2013062427 A1 | 5/2013 |
| WO | 2013122483 A1 | 8/2013 |
| WO | 2014083015 A1 | 6/2014 |
| WO | 2014122121 A1 | 8/2014 |
| WO | 2014122125 A1 | 8/2014 |

OTHER PUBLICATIONS

Bosshard et al., "Comprehensive Evaluation of Rectangular and Double-D Coil Geometry for 50 kw/85 kHz IPT System" IEEE Journal of Emerging and Selected Topics on Power Electronics (JESTPS), vol. 4, No. 4, Dec. 31, 2016 (Dec. 31, 2016), pp. 1406-1415, XP002781665, DOIL 10-1109/JESTPE.2016.2600162, p. 1408.

Miyamori, J. et al., Examination of Phase Excitation in a Desktop CLPS, Journal of Magnetics Society of Japan, Graduate School of Engineering, Tohoku Gakuin University, Jan. 9, 2009, pp. 110-113, vol. 33, No. 2, NEC Tokin Corporation, Taihaku-ku, Sendai, Japan.

J. Miyamori et al., Examination of Phase Excitation in a Desktop CLPS, Journal of the Magnetics Society of Japan, Apr. 23, 2009, p. 110-113, vol. 33 No. 2, The Magnetics Society of Japan, Tokyo, Japan.

Boys, John T., et al., "Controlling Inrush Currents in Inductively Coupled Power Systems", 2005 International Power Engineering Conference, Nov. 29, 2005-Dec. 2, 2005, 7, IEEE, Singapore, Singapore.

* cited by examiner

INDUCTIVE POWER TRANSFER ASSEMBLY

This application claims the benefit of provisional patent application No. 62/653,406, filed Apr. 5, 2018, which is hereby incorporated by reference herein in its entirety.

FIELD

This relates generally to wireless systems, and, more particularly, to systems in which devices are wirelessly charged.

BACKGROUND

In a wireless charging system, a wireless power transmitting device such as a device with a charging surface or zone wirelessly transmits power to a portable electronic device. The portable electronic device receives the wirelessly transmitted power and uses this power to charge an internal battery or to power the device.

SUMMARY

In some situations, achieving good coupling between inductive power transmitters and receivers can be difficult. Poor coupling can result in slow charging of power receivers, high power consumption in transmitters, high leakage of charging fields and energy inefficiency.

In the system, a wireless power transmitting device transmits wireless power signals to a wireless power receiving device. The wireless power transmitting device has an inverter that supplies signals to an output circuit that includes wireless power transmitting coils. The wireless power receiving device includes wireless power receiving coils.

The wireless power transmitting device includes a magnetic core that has a base portion with first and second limbs extending from the base portion. The coils of the wireless power transmitting device are wound about the limbs of the magnetic core of the wireless power transmitting device.

The wireless power receiving device includes a magnetic core that has a base portion with first and second limbs extending from the base portion. The coils of the wireless power receiving device are wound about the limbs of the magnetic core of the wireless power receiving device. Magnetic cores can assist in directing and concentrating magnetic flux produced by the transmitting device and received by the receiving device.

The wireless power receiving device can also include a transverse coil wound about the base portion of the magnetic core of the wireless power receiving device. The transverse coil can improve reception of wireless power signals. For example, the transverse coil can receive power from wireless power fields oriented transverse to the direction of extension of the limbs of the magnetic core. In some situations, the wireless power receiving device could be placed on a charging mat or similar assembly with a charging surface. The wireless power receiving device may be arranged such that the transverse coil is aligned substantially parallel to the charging surface when the receiving device is placed on the charging surface in order to receive power in the transverse coil. In some situations, the wireless power receiving device could be configured to couple to a corresponding transmitter in a preferred position/orientation during charging. In these situations, the transverse coil may improve coupling in the case that the receiving device is not optimally positioned or oriented with respect to the transmitting device.

DETAILED DESCRIPTION

Figure 1:
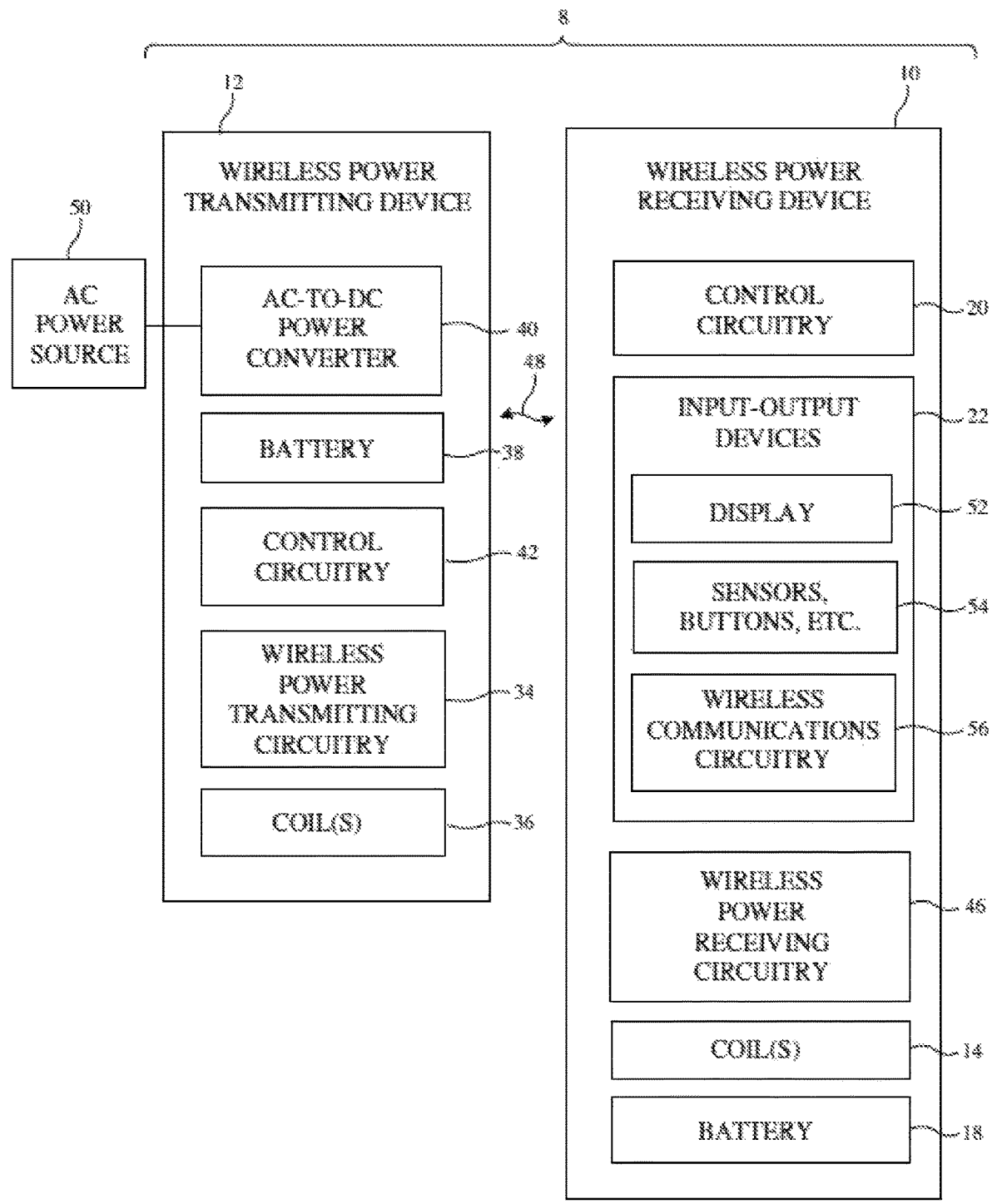
FIG. 1 is a schematic diagram of an illustrative wireless charging system in accordance with some embodiments.
Figure 2:
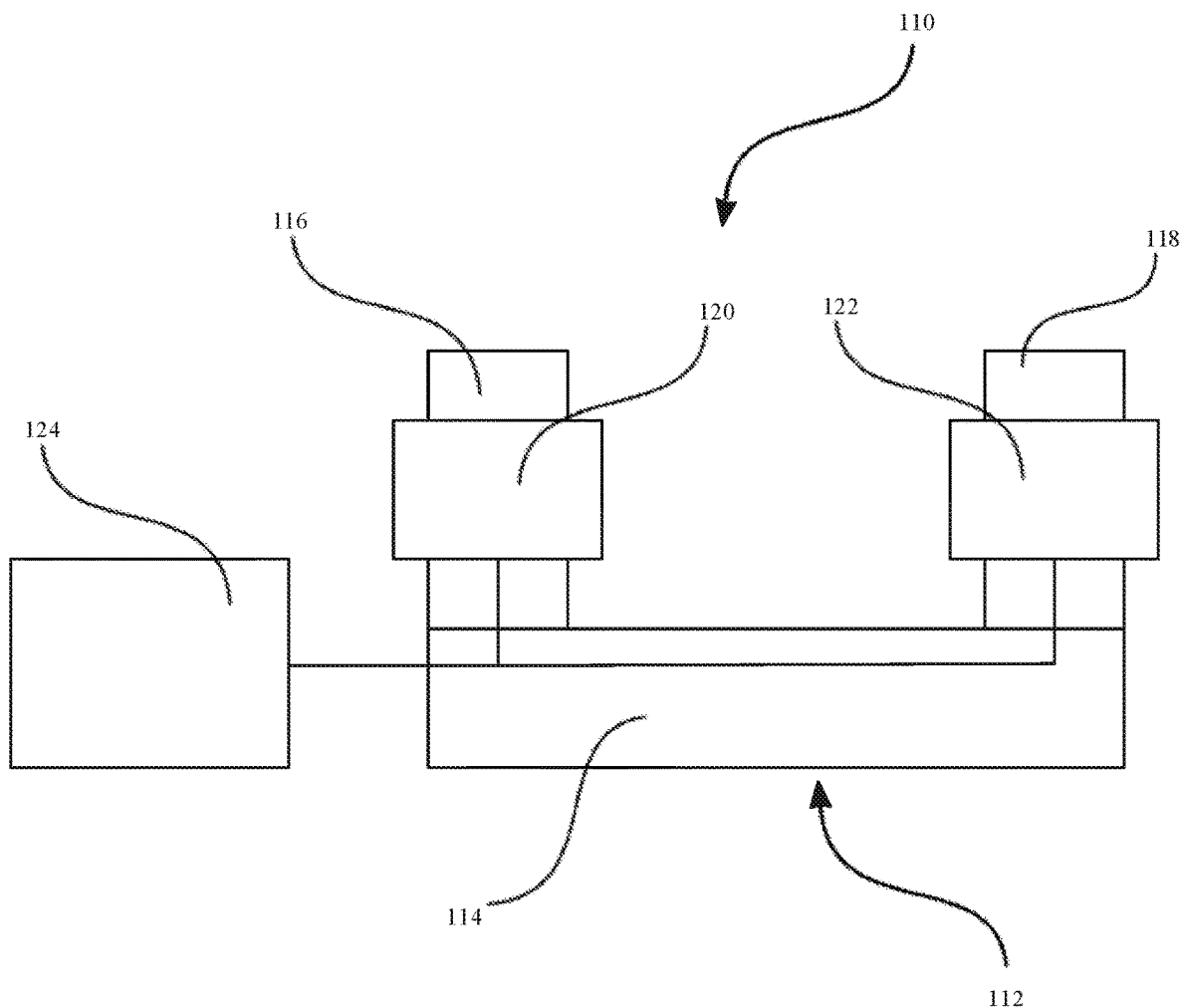
FIG. 2 is a schematic diagram of an illustrative inductive power transfer assembly with a core, coils and in inverter in accordance with an embodiment.

A wireless power system has a wireless power transmitting device that transmits power wirelessly to a wireless power receiving device. The wireless power transmitting device is a device such as a wireless charging mat, wireless charging puck, wireless charging stand, wireless charging table, or other wireless power transmitting equipment. The wireless power transmitting device may be a stand-alone device or built into other electronic devices such as a laptop or tablet computer, cellular telephone or other electronic device. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, remote control, laptop computer, electronic pencil or stylus, other portable electronic device, or other wireless power receiving equipment.

During operation, the wireless power transmitting device supplies alternating-current signals to one or more wireless power transmitting coils. This causes the coils to transmit alternating-current electromagnetic signals (sometimes referred to as wireless power signals) to one or more corresponding coils in the wireless power receiving device. Rectifier circuitry in the wireless power receiving device converts received wireless power signals into direct-current (DC) power for powering the wireless power receiving device.

Wireless power transmitting and receiving devices can be designed to cooperate specifically with each other. For example, the size, shape, number, dimensions and configuration of coils of one or both of the devices may be selected based on the other device. Magnetic elements may also be included in the transmitting and/or receiving device, and the size, shape, number, dimensions and configuration of the magnetic elements may be selected based on the other device.

In some cases, wireless power transmitting and receiving devices can be designed to be closely coupled to each other. Typically, this is achieved by arranging the coils of the transmitting and receiving devices such that they are aligned with and close to each other in use. Systems in which the transmitting and receiving devices can be closely coupled to each other in use are sometimes referred to as inductive power transfer systems. Transmitting and receiving devices that can be closely coupled to receiving devices can be referred to as inductive power transfer devices.

Wireless power transmitting and receiving devices and transmitters can also be designed to cooperate with each other in particular orientations, positions or other spatial relationships. For example, some receiving devices may have a preferred position or orientation with respect to a transmitting device. This preferred position or orientation may allow for good power transfer, minimum leakage of the charging field and other advantageous effects. The transmitting and/or receiving devices may have visual markings to indicate where or in what orientation to place the receiving device, engaging elements to hold the receiving device in a particular position or orientation, magnetic couplings or other biasing elements to urge the receiving device towards a particular position or orientation, or other arrangements.

Wireless power transmitting and receiving devices can also be used with other devices without being specifically designed to cooperate with them. For example, a wireless power transmitting device can operate with many different types of receiving devices having different coil arrangements, different (or no) magnetic elements, sizes, shapes and other characteristics. A wireless power receiving device can operate with many different types of transmitting devices having different coil arrangements, different (or no) magnetic elements, sizes, shapes and other characteristics.

Wireless power transmitting and receiving devices can also be used in various orientations, positions or other spatial relationships. For example, wireless power transmitting or receiving devices may be provided without visual markings, engaging elements, magnetic couplings or other biasing elements, or other arrangements. Alternatively, transmitting or receiving devices may have these arrangements but still operate in various other orientations and positions.

An illustrative wireless power system (wireless charging system) is shown in FIG. 1. As shown in FIG. 1, a wireless power system 8 includes a wireless power transmitting device 12 and one or more wireless power receiving devices such as wireless power receiving device 10. Device 12 may be a stand-alone device such as a wireless charging mat, may be built into furniture, laptop or tablet computers, cellular telephones or other electronic devices, or may be other wireless charging equipment. Device 10 is a portable electronic device such as a wristwatch, a cellular telephone, a tablet computer, an electronic pencil or stylus, or other electronic equipment. Illustrative configurations in which device 12 is a tablet computer or similar electronic device and in which device 10 is an electronic accessory that couples with the tablet computer or similar electronic device during wireless power transfer operations may sometimes be described herein as examples. Illustrative configurations in which device 12 is a mat or other equipment that forms a wireless charging surface and in which device 10 is a portable electronic device or electronic accessory that rests on the wireless charging surface during wireless power transfer operations may also sometimes be described herein as examples.

During operation of system 8, a user places one or more devices 10 on or near the charging region of device 12. Power transmitting device 12 is coupled to a source of alternating-current voltage such as alternating-current power source 50 (e.g., a wall outlet that supplies line power or other source of mains electricity), has a battery such as battery 38 for supplying power, and/or is coupled to another source of power. A power converter such as AC-DC power converter 40 can be included to convert power from a mains power source or other AC power source into DC power that is used to power control circuitry 42 and other circuitry in device 12. During operation, control circuitry 42 uses wireless power transmitting circuitry 34 and one or more coils 36 coupled to circuitry 34 to transmit alternating-current electromagnetic signals 48 to device 10 and thereby convey wireless power to wireless power receiving circuitry 46 of device 10.

Power transmitting circuitry 34 has switching circuitry (e.g., transistors in an inverter circuit) that are turned on and off based on control signals provided by control circuitry 42 to create AC current signals through appropriate coils 36. As the AC currents pass through a coil 36 that is being driven by the switching circuitry, a time varying electromagnetic field (wireless power signals 48) or "flux" is produced, that is received by one or more corresponding coils 14 electrically connected to wireless power receiving circuitry 46 in receiving device 10. If the time varying electromagnetic field is magnetically coupled to coil 14, an AC voltage is induced and a corresponding AC currents flows in coil 14. Rectifier circuitry in circuitry 46 can convert the induced AC voltage in the one or more coils 14 into a DC voltage signals for powering device 10. The DC voltages are used in powering components in device 10 such as display 52, touch sensor components and other sensors 54 (e.g., accelerometers, force sensors, temperature sensors, light sensors, pressure sensors, gas sensors, moisture sensors, magnetic sensors, etc.), wireless communications circuits 56 for communicating wirelessly with control circuitry 42 of device 12 and/or other equipment, audio components, and other components (e.g., input-output devices 22 and/or control circuitry 20) and/or are used in charging an internal battery in device 10 such as battery 18, or to charge subsequent devices, either wired or wirelessly.

Devices 12 and 10 include control circuitry 42 and 20. Control circuitry 42 and 20 may include storage and processing circuitry such as analogue circuitry, microprocessors, power management units, baseband processors, digital signal processors, field-programmable gate arrays, microcontrollers, application-specific integrated circuits with processing circuits and/or any combination thereof. Control circuitry 42 and 20 is configured to execute instructions for implementing desired control and communications features in system 8. For example, control circuitry 42 and/or 20 may be used in determining power transmission levels, processing sensor data, processing user input, processing other information such as information on wireless coupling efficiency from transmitting circuitry 34, processing information from receiving circuitry 46, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, coil assignments in a multi-coil array, and wireless power transmission levels, and performing other control functions. Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g. tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

Device 12 and/or device 10 may communicate wirelessly. Devices 10 and 12 may, for example, have wireless transceiver circuitry in control circuitry 42 and 20 (and/or wireless communications circuitry such as circuitry 56 of FIG. 1) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.). For example device 12 and/or device 10 may communicate using in-band communications injected or combined into the wireless power signals 48 such as proposed in the Wireless Power Consortium Qi specification 1.1, which is incorporated herein by reference. Alternatively a separate Bluetooth®, RFID, NFC, Zigbee, Wifi RF or other communication system may be employed.

An illustrative inductive power transfer assembly 110 is shown in FIG. 2-5. As shown in FIG. 2-5, the inductive power transfer assembly 110 includes a magnetic core having a base 114, a first limb 116 and a second limb 118. The base has a front surface 113 and a back surface 115. The inductive power transfer assembly also includes a first coil 120 wound about the first limb 116 and a second coil 122 wound about the second limb 118. The coils 120, 122 are connected to inverter circuitry 124. The inverter circuitry 124 can drive the coils 120, 122 to generate flux. During operation, the first coil 120 and second coil 122 can be driven to generate flux having opposing polarity.

Various types of inverter circuitry can be used to drive the coils 120, 122. For example, a simple chopper circuit can be used to provided alternating current signals to the coils 120, 122. In such a circuit, a switch or combination of switches can alternately connect a DC supply voltage to different sides of a coil to provide an alternating voltage across, and current through, the coil. Capacitive or inductive elements can be used to smooth the output waveform.

In some examples, the inverter circuitry 124 may be a push-pull inverter in which the coils are connected in series and switches operate to provide an alternating voltage across, and current through, the coils. In some examples, the inverter may be a resonant inverter that includes one or more capacitive elements that form(s) a resonant circuit with one or both of the coils 120, 122 and optionally other inductive elements. Resonant inverters can include actively controlled switches that are controlled based on the resonant frequency of the inverter circuit. Resonant inverters can be soft switched, using zero voltage or zero current switched, hard switched or a variation of either.

Figure 6:
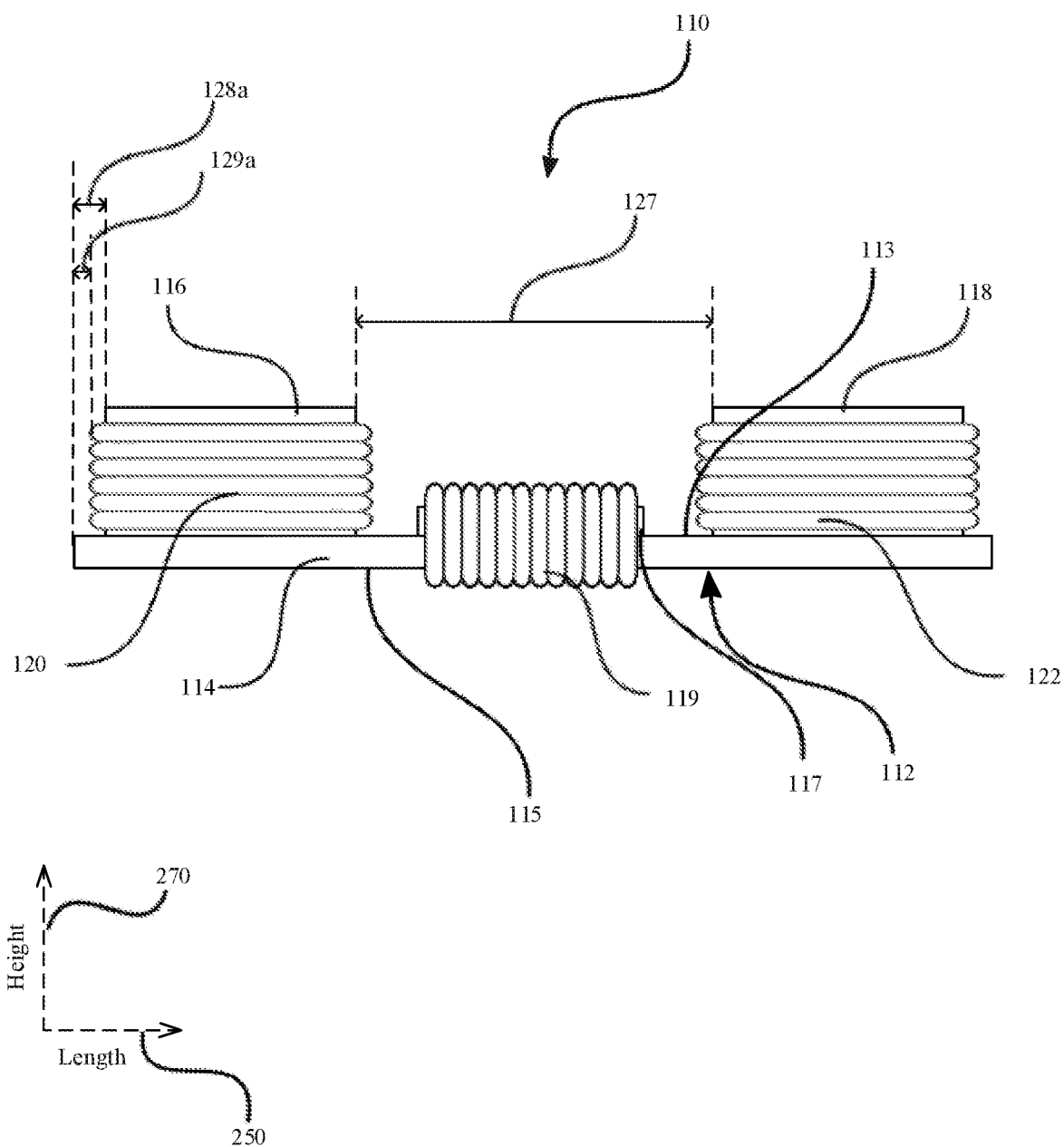
FIG. 6 is a side view of an illustrative inductive power transmitting device including a third limb and a transverse coil.
Figure 7:
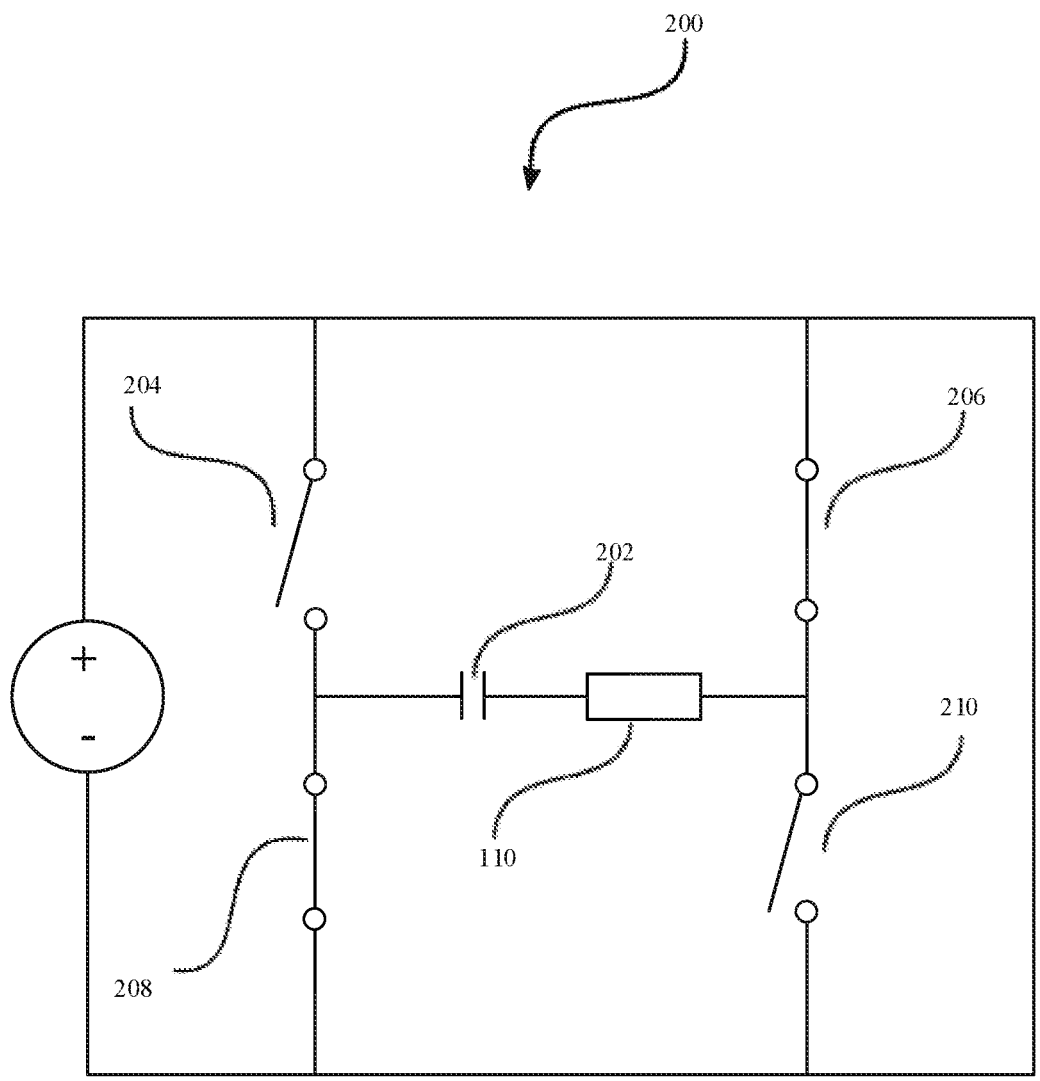
FIG. 7 is a schematic view of an illustrative inductive power transmitter circuit.

One illustrative inverter is shown in the inductive power transmitter circuit 200 of FIG. 6. In this example, the inverter 124 is an H-bridge inverter comprised of a DC source and switches 204, 206, 208, 210. The switches 204, 206, 208, 210 are alternately operated in pairs to provide alternating current to the inductive power transfer assembly 110. In particular, switches 204 and 210 may be closed simultaneously, while switches 206, 208 are open, to provide current flow in a first direction through the transfer assembly 110. Then switches 206, 208 can be closed simultaneously, while switches 204, 210 are open, to provide current flow the opposite direction through the transfer assembly 110. In this example, the inductive power transfer assembly is connected in series with a capacitor 202. The combination of the coils 120, 122 of the transfer assembly 110 and the capacitor 202 creates a resonant circuit. The switches 204, 206, 208, 210 may be operated at or near the resonant frequency of the resonant circuit or with some other relationship to the resonant frequency.

It will be appreciated that there are many types of inverter suitable for supplying alternating current to transmitter coils that would be suitable for use with the present power transmitting device.

The inverter circuitry 124 drives the coils 120, 122 to generate flux having opposed polarity. In some examples, the coils 120, 122 are electrically connected in series but have opposed magnetic axes. For example, a single length of conductor can be wound into two coils having opposite winding directions—i.e. such that current flowing clockwise through one flows counter-clockwise through the other—such that the magnetic axes of the coils 120, 122 are oriented to oppose each other. The inverter circuitry 124 is arranged to supply the length of conductor with electric current, which will cause the coils 120, 122 to generate flux having opposed polarity. The polarity of the flux generated by one coil may have an orientation substantially 180 degrees different from the polarity of flux generated by the other coil.

The coils 120, 124 may each be wound about the respective limbs 116, 118 circumferentially along the axis of the respective limb—i.e. in the direction that the limb extends from the front surface 113 of the base 114.

In some examples, the coils 120, 122 are electrically connected in parallel but have opposed magnetic axes. For example, two lengths of conductor can be wound into two coils having opposite winding directions—i.e. such that a current will flow clockwise through one and counter-clockwise through the other—such that the magnetic poles of the coils 120, 122 are oriented oppositely. Or alternatively the coils may be connected with the opposite ends connected to the inverter output terminals respectively, to drive the current in the opposite direction. The inverter circuitry 124 is arranged to supply the lengths of conductor with electric currents of similar phase, which will cause the coils 120, 122 to generate flux having opposed polarity.

In some examples, the coils 120, 122 are wound with separate conductors wound in the same winding direction—i.e. both clockwise or counter-clockwise. The inverter circuitry 124 is arranged to supply the coils 120, 122 with electric currents of opposing phase, which will cause the coils 120, 122 to generate flux having opposed polarity.

In some examples, the inverter circuitry 124 can include a separate inverter for each coil. The separate inverters may independently control the phase of current supplied to the coils 120, 122 to operate with various different phase relationships. This allows the inverter circuitry 124 to independently control the polarity of flux generated by the coils 120, 122 to operate the transmitting device 110 with various different flux polarity relationships.

The transfer assembly 110 may also be provided with phase-delay components to provide a controllable phase difference between current in the first coil 120 and current in the second coil 122. In these examples, a single inverter may drive both coils 120, 122 while still providing for independent control of current in the coils 120, 122 to operate the transmitting device with various different flux polarity relationships. The phase delay components may include analog components such as capacitors and inductors or digital components such as integrated circuits or microcontrollers.

It will be appreciated that the coils may be wound from a single-strand conductor, a multiple strand conductor having multiple wires connected in parallel, braided wire, Litz wire, a conductive ink or conductive trace such as multilayer tracks on a printed circuit board, or other conductive elements suitable for forming coils.

In some examples, the coils 120, 122 are comprised of between 10 and 50 turns, between 15 and 30 turns, or approximately 20 turns. In some examples, the coils are comprised of between 1 and 5 layers, between 1 and 3 layers, or 2 layers. In some examples, the coils have the same number of turns as each other. In some examples, the coils have the same number of windings as each other. In some examples, the coils are comprised of the same number of layers as each other.

In some examples, the coils 120, 122 extend in the width direction between 1 mm and 10 mm, between 2 mm and 7 mm, between 2.7 mm and 5 mm, or approximately 3.2 mm.

In some examples, the coils each extend in the length direction between 3 mm and 20 mm, between 5 mm and 15 mm, between 6.5 mm and 11 mm, or approximately 7.5 mm.

In some examples, the coils each extend in the height direction between 0.5 mm and 4 mm, between 1 mm and 3 mm, between 1.6 mm and 2.5 mm, or approximately 2.1 mm.

In some examples, the inductive power transfer assembly 110 may include a transverse coil 119 wound about at least the base 114 of the core 112. The transverse coil 119 can be driven to produce a magnetic flux through the core in the same direction as the flux produced by the first and second coils. This may result in a greater total flux being produced by the assembly 110. The assembly 110 may include a third limb 117 onto which the transverse coil 119 is wound. The third limb 117 can be located centrally between the first and second limbs 116, 118. The third limb 117 can be located on the base 114 of the core 112. The third limb 117 also extends away from the front surface 113 of the core 112. The third limb 117 may be substantially parallel to one or both of the first and second limbs 116, 118.

In some examples, the transverse coil 119 is comprised of between 18 and 60 turns, between 24 and 45 turns, between 30 and 38 turns, or approximately 33 turns. In some examples, the transverse coil is comprised of between 1 and 7 layers, between 2 and 5 layers, or 3 layers. The transverse coil may be between 1 mm and 20 mm in length, between 2 mm and 10 mm in length, between 3 mm and 5 mm in length, or approximately 3.6 mm in length.

The transverse coil 119 can be a solenoid coil in which the length of the coil is greater than the diameter of the coil.

Each coil may be wound onto carrier, such as a bobbin or former, before being placed on the core 114. Alternatively, each coil may be wound directly to the core 112.

The first and second coils 120, 122 may be arranged to couple to coils of an inductive power receiving device. The coils 120, 122 may be located, oriented or sized to couple to coils of the inductive power receiving device. For example, the coils 120, 122 can be wound about limbs 116, 118 that are spaced a distance 127 apart to at least partially align with limbs and coils of an inductive power receiving device that power is to be transmitted to. This may enable the flux generated by the transfer assembly coils 120, 122 to efficiently couple into the receiving device coils.

The limbs 116, 118 may be spaced apart in the length direction by a distance 127 that is less than the spacing of the limbs of an inductive power receiving device. The distance 127 may be between 1 mm and 6 mm, between 2 mm and 4.5 mm, between 2.6 mm and 3.5 mm, or approximately 2.9 mm.

The distance 127 between the first and second limbs 116, 118 has an effect on the coupling between the power transfer assembly 110 and an inductive power receiver. Smaller distances may result in higher maximum coupling (when the transfer assembly 110 and receiver are optimally aligned than larger distances. However, transfer assemblies with smaller distances between the first and second limbs may be more sensitive to misalignment, such that the amount of power transferred from the assembly 110 to a receiver decreases more quickly with increasing misalignment than it does for transfer assemblies with larger distances between limbs.

The distance 127 can be selected based on the degree of misalignment expected between the assembly 110 and an inductive power receiver in use. In some examples, a misalignment of approximately +/−2 mm along either or both of the length and width axes 250, 260 may be expected in use.

In some examples, the core 112 may not include first and second limbs or first and second coils. In these examples, the assembly 110 may include a substantially flat core 112 with a transverse coil wound about the core 112. These assemblies may be easier to manufacture than assemblies with first and second limbs and first and second coils.

The base 114 of the magnetic core 112 can be elongate, having one long axis, the "length" 250, and two shorter orthogonal axes, the "width" 260 and "height" 270. The length 250 and width 260 lie on a major "front" surface 113 from which the limbs 116, 118 extend. The limbs 116, 118 can be spaced from each other along the length axis 250.

The length of the core 112 may be between 5 mm and 50 mm, between 10 mm and 35 mm, between 15 mm and 25 mm, or approximately 18 mm. The width of the core 112 may be between 1 mm and 10 mm, between 2 mm and 7 mm, between 2.8 mm and 5 mm, or approximately 3.4 mm. The height of the core 112 may be between 0.8 mm and 30 mm, between 1.5 mm and 15 mm, between 2.2 mm and 8 mm, or approximately 2.55 mm.

The extension of the first and second limbs 116, 118 along the length axis 250 may be between 1 mm and 20 mm, between 4.5 mm and 14 mm, between 6 mm and 10 mm, or approximately 7 mm. The extension of the first and second limbs 116, 118 along the width axis 260 may be between 1 mm and 10 mm, between 2 mm and 7 mm, between 2.5 mm and 5 mm, or approximately 3 mm. The extension of the first and second limbs 116, 118 along the height axis 270 may be between 0.5 mm and 20 mm, between 1.2 mm and 10 mm, between 1.8 mm and 5 mm, or approximately 2 mm.

The length of the base 114 may be between 5 mm and 50 mm, between 10 mm and 35 mm, between 15 mm and 25 mm, or approximately 18 mm. The width of the base 114 may be between 1 mm and 10 mm, between 2 mm and 7 mm, between 2.8 mm and 5 mm, or approximately 3.4 mm. The height of the base 112 may be between 0.1 mm and 10 mm, between 0.3 mm and 5 mm, between 0.4 mm and 2 mm, or approximately 0.5 mm.

The ratio of the extension along the length axis of the base 114 to either of the first and second limbs 116, 118 may be between 3:1 and 5:2, or approximately 18:7.

The inductive power assembly core 112 may be the same length as the core of an inductive power receiving device. The inductive power assembly core 112 may be longer than the core of an inductive power receiving device.

Figure 3:
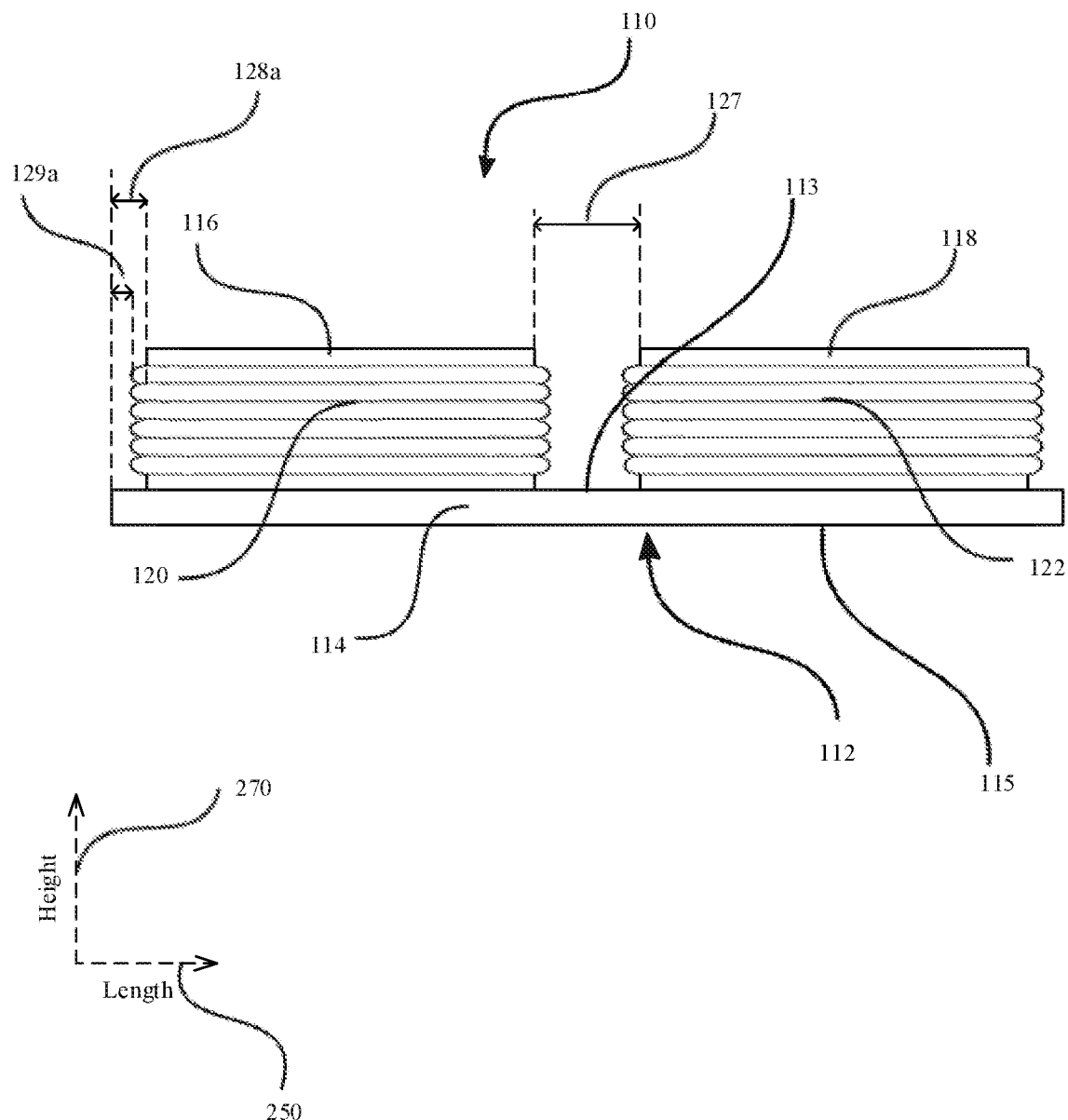
FIG. 3 is a side view of an illustrative inductive power transmitting device showing the core, base, first and second limbs, first and second coils in accordance with an embodiment.
Figure 4:
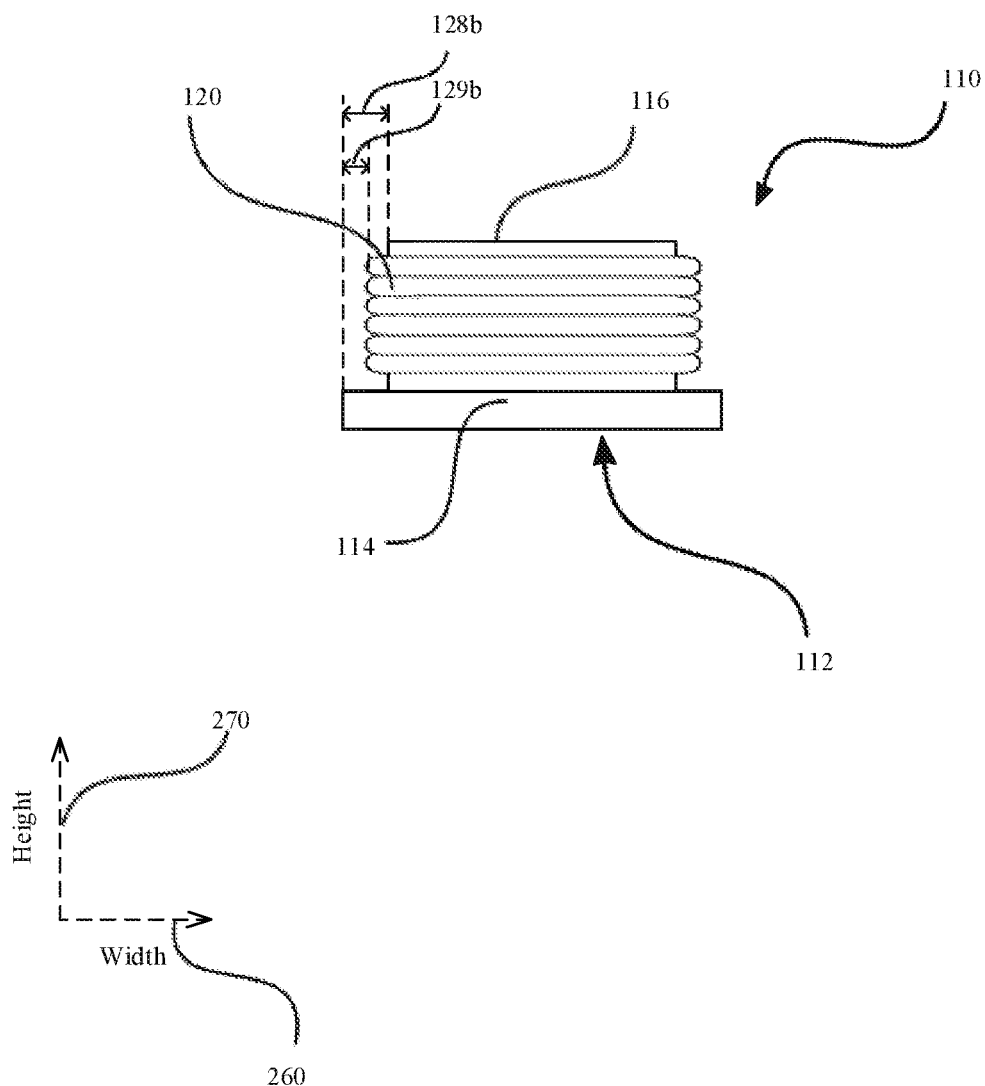
FIG. 4 is an end view of an illustrative inductive power transmitting device showing the base, one of the limbs and one of the coils in accordance with an embodiment.
Figure 5:
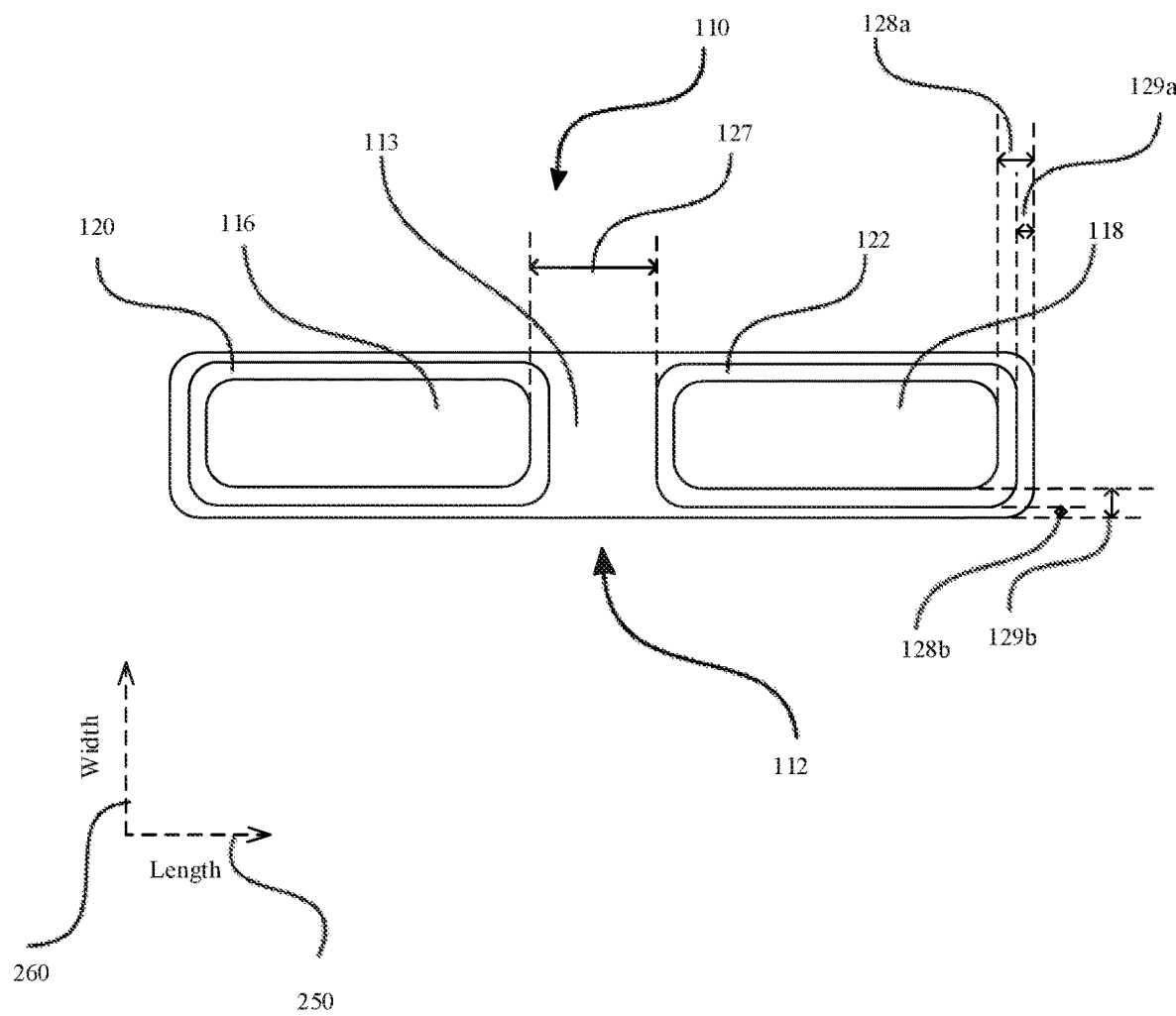
FIG. 5 is a top view of an illustrative inductive power transmitting device showing the core, limbs and coils.

The first and second limbs 116, 118 may be inset from the perimeter of the base 114. This is shown in FIG. 3-5. In the side view of FIG. 3, the first and second limbs are inset from the perimeter of the base in the length direction as indicated at 128*a*. In the end view of FIG. 4, the first and second limbs are inset from the perimeter of the base in the width direction 260 as indicated at 128*b*. The top view of FIG. 5 shows the insets 128*a*, 128*b* of the limbs 116, 118 in both the width 260 and length 250 directions. The limbs may be inset by the same amount. Alternatively, the inset in one direction may be greater than the inset in the other direction.

The insets 128*a*, 128*b* may be such that the base extends further in the width and/or length directions than the first and second limbs 116, 118 by 1%, 5% or 10%. In some examples, the insets may each be between 0 mm and 10 mm, between 0.3 mm and 6 mm, between 0.6 and 3 mm, or approximately 0.75 mm.

The inset of the limbs reduces the overall length and width of the assembly when the coils are wound onto the limbs and can reduce fringing of the magnetic field to the sides and back 115 of the transfer assembly.

The coils 120, 122 may be wound onto the first and second limbs 116, 118 such that the coils 120, 122 are inset from the perimeter of the base 114. This is shown in FIG. 3-5. In the side view of FIG. 3, the first and second coils are inset from the perimeter of the base in the length direction 250 as indicated at 129*a*. In the end view of FIG. 4, the first and second coils are inset from the perimeter of the base in the width direction 260 as indicated at 129*b*. The top view of FIG. 5 shows the insets 129*a*, 129*b* of the coils 120, 122 in both the width 260 and length 250 directions.

The insets 129*a*, 129*b* of the coils described above mean that the base 114 of the core 112 extends out from the coils 120, 122 in the width 260 and length 250 directions, which may help reduce fringing of the magnetic field to the sides and back 115 of the transfer assembly 110 (i.e. in directions other than the direction of extension of the limbs).

The insets 129*a*, 129*b* may be such that the base extends further in the width and/or length directions than the first and second coils 120, 122 by 1%, 5% or 10%. In some examples, the insets may each be between 0 mm and 5 mm, between 0.1 mm and 3 mm, between 0.2 and 1 mm, or approximately 0.25 mm.

The first and second limbs 116, 118 may be the same size and shape as each other.

The first and second limbs 116, 118 may both extend in a direction substantially orthogonal to the planar surface at the front surface 113 of the base 114, i.e. in the "height" direction 270. For example the limbs 116, 118 may extend at an angle of up to 30 degrees to the normal of the planar front surface of the base; up to 15 degrees to the normal of the planar front surface of the base; up to 5 degrees to the normal of the planar front surface of the base; or approximately 0 degrees to the normal of the planar front surface of the base.

As shown in the top view of FIG. 5, the corners of the base may be rounded. This may provide improved guiding and shaping of the magnetic field and reduced leakage flux. It may also make the core easier to manufacture.

In use, the magnetic field generated by the coils 120, 122 can be guided by the first and second limbs 116, 118 of the core 112 and extend out from the distal end of one limb away from the base 114 of the core 112. The field may extend into the distal end of the other limb toward the base 114. It will be appreciated that the polarity of the magnetic field at a given time depends on the phase of current being supplied to the coils 120, 122, and that when the direction of current changes, the direction of extension of the magnetic field will also change.

The relatively short extension of the core 112 in the height 270 and width 260 directions results in an elongate assembly 110 that can be installed in small compartments, housings or devices.

For example, the inductive power transfer assembly 110 may be installed in a laptop or tablet computer or mobile phone. These devices are typically thin and have limited space for components. This requires a transfer assembly to have small dimensions to fit within the device.

The core 112 is made of magnetically permeable material. For example, the core 112 may be ferrite, iron, mild steel, mu-metal or other magnetic materials. The core 112 may be a single piece or made from separate pieces. The core 112 may be moulded, sintered, formed from laminations or manufactured by other processes.

The inductive power transfer assembly 110 can be provided as part of wireless power charging device. For example, the transfer assembly can be provided in a charging base or stand, with which one or more devices to be charged wirelessly can engage. The wireless power charging device can take the form of a case, box or enclosure into which one or more devices to be charged can be placed. The wireless power charging device can take the form of an electronic device with built-in wireless charging capabilities that supplies wireless power in a charging region of the device. The wireless power charging device can take the form of a charging mat having a charging surface onto which one or more devices to be charged can be placed.

The inductive power transfer assembly 110 may be provided within an electronic device such as a laptop or tablet computer or a mobile phone. In one example, the device may have a charging zone for charging accessories such as styluses and electronic pencils. The inductive power transfer assembly can be arranged within the device to provide a charging field in the charging zone. The transfer assembly can be arranged such that limbs extend towards the exterior of the device at the charging zone.

The transfer assembly 110 may be provided in a compartment of the device and the compartment may have a partial electromagnetic shield or plating to shield electronics of the device from the charging field. The shield or plating may be made of copper or another suitable shielding material. The base of the core can extend across the width of the compartment.

Figure 14:
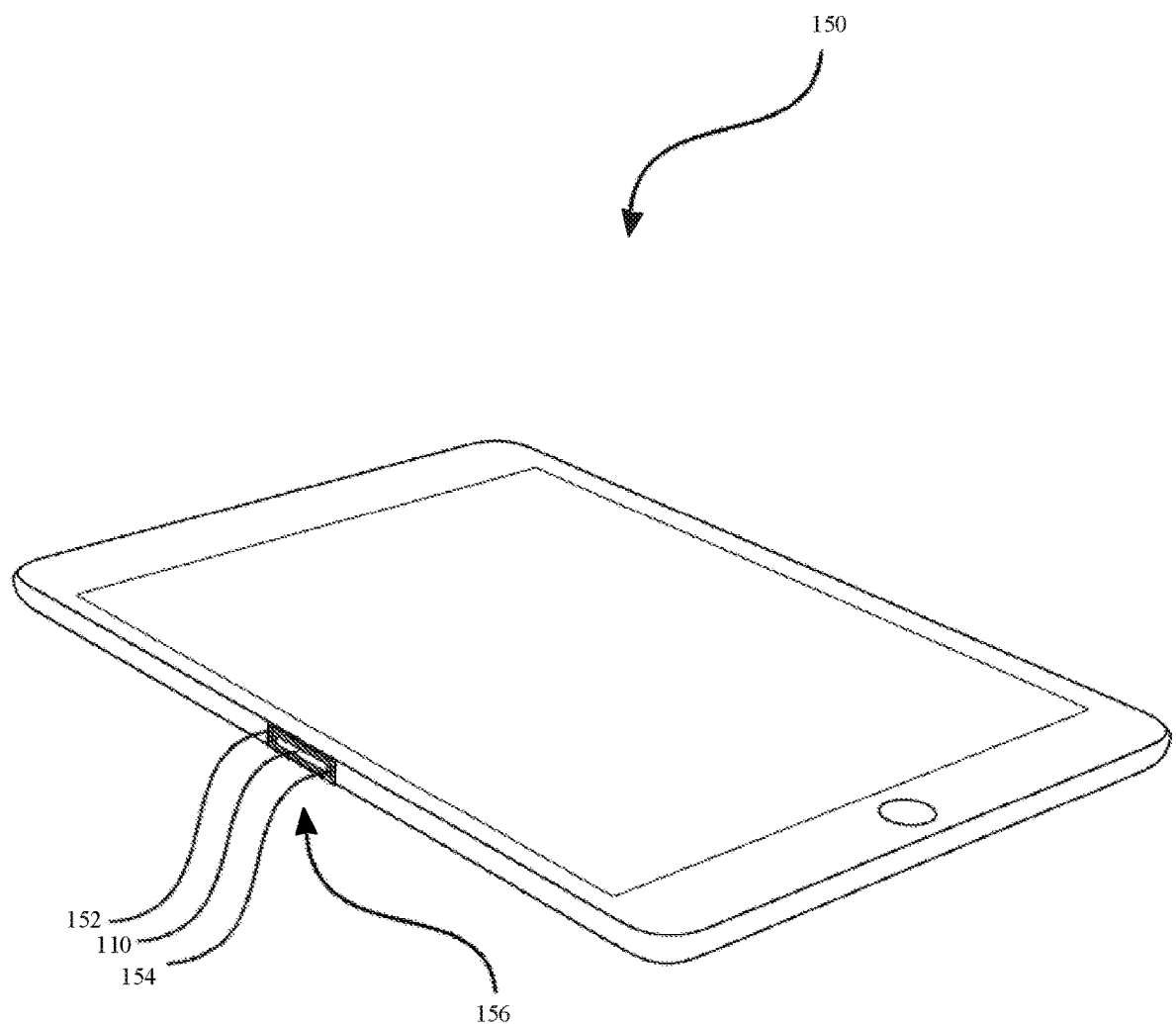
FIG. 14 is a schematic diagram of an illustrative tablet computer including an inductive power receiving device in accordance with an embodiment.

FIG. 14 is an illustrative embodiment of a tablet computer 150 including an inductive power transfer assembly 110. The inductive power transfer assembly 110 is shown within a compartment 152 of the tablet computer 150. The compartment 152 or transfer assembly 110 includes a partial shield or plating 154. The tablet computer 150 has a charging zone 156 at its surface in the region of the transfer assembly 110. Devices to be charged can be placed in the charging zone 156 to receive power wirelessly from the inductive power transfer assembly 110. The inductive power transfer assembly 110 may be located at the side of the tablet computer 150.

The partial shield or plating 154 can act as a magnetic shield to reduce the amount of flux generated by the transfer assembly 110 reaching electronic components of the tablet computer 150.

The tablet computer 150 can include magnets or other coupling means for retaining a wireless power receiving device placed at or near the charging zone 156. For example, magnets could be provided as part of the transfer assembly 110, within the compartment 152, or in the region around the compartment 152.

Figure 15:
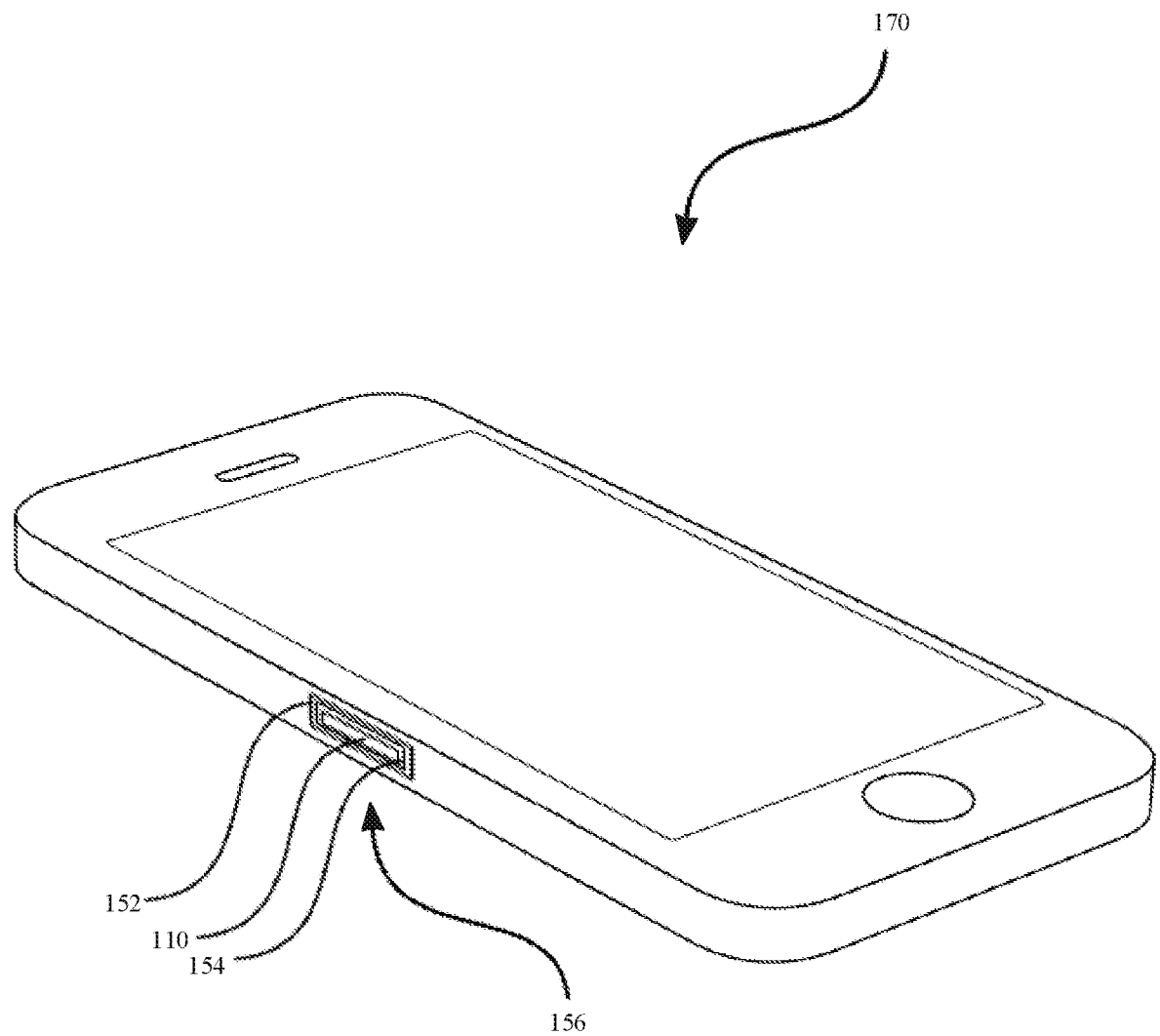
FIG. 15 is a schematic diagram of an illustrative mobile phone including an inductive power receiving device in accordance with an embodiment.

FIG. 15 is an illustrative embodiment of a mobile phone 170 including an inductive power transfer assembly 110. The inductive power transfer assembly 110 is shown within a compartment 152 of the mobile phone 170. The compartment 152 or transfer assembly 130 includes a partial shield or plating 154. The mobile phone 170 has a charging zone 156 at its surface in the region of the transfer assembly 130. Devices to be charged can be placed in the charging zone 156 to receive power wirelessly from the inductive power transfer assembly 110. The inductive power transfer assembly 110 may be located at the side of the mobile phone 170.

An illustrative inductive power transfer assembly 130 is shown in FIG. 8-11. As shown in FIG. 8-11, the inductive power transfer assembly 130 includes a magnetic core 132 having a base 134, a first limb 136 and a second limb 138. The base has a front surface 133 and a back surface 135. The inductive power transfer assembly 130 also includes a first coil 140 wound about the first limb 136, a second coil 142 wound about the second limb 138, and a transverse coil 144 wound about the base 134.

Each of the first and second coil 140, 142 may produce current from flux received in the limb on which it is wound. The transverse coil 144 may produce current from flux received in the base 134. In some examples the transverse coil 144 may produce current from flux received in the base 134 and a third limb 137.

The first and second power receiving coils 140, 142 may be arranged to couple to a first type of inductive power transmitting device and the transverse power receiving coil 144 may be arranged to couple to a second type of inductive power transmitter. For example, the first and second power receiving coils 140, 142 may be arranged to cooperate with corresponding limbs of an inductive power transmitter to form a low-reluctance loop out of the core 132 of the transfer assembly 130 and a corresponding core of the transmitter. The transverse coil 144 may be arranged to couple to a charging field at a charging surface of a charging mat.

The inductive power transfer assembly 130 may also include converter circuitry to convert the power received by one or more of the coils 140, 142 to a suitable form for a load or for powered components of the receiver device. For example, the converter may be a rectifier that converts alternating current (AC) power to direct current (DC) power.

The first and second coils 140, 142 may each be wound about the respective limb circumferentially along the axis of the limb—i.e. in the direction that the limb extends from the base 134.

The first and second coils 140, 142 may be arranged to receive flux of opposing polarity and provide it to the converter.

In some examples, the first and second coils 140, 142 are electrically connected in series but have opposed magnetic axes. For example, a single length of conductor can be wound into two coils having opposite winding directions—i.e. such that current flowing clockwise through one flows counter-clockwise through the other—such that the magnetic axes of the coils 120, 122 are oriented to oppose each other.

In some examples, the first and second coils 140, 142 are electrically connected in parallel but have opposed magnetic axes. For example, two lengths of conductor can be wound into two coils having opposite winding directions—i.e. such that currents of similar phase will flow clockwise through one and counter-clockwise through the other—such that the magnetic axes of the coils 140, 142 are oriented to oppose each other.

In some examples, the coils are wound in the same direction—i.e. both clockwise or both counter-clockwise—such that the magnetic axes of the coils are oriented to not oppose each other. In this case, the converter circuitry may convert the power received from the coils 140, 142 separately. For example, the converter circuitry could include a separate rectifier for each of the first and second coils 140, 142.

The transverse coil 144 could also be connected to the same rectifier as one or both of the first and second coils, or to a further rectifier. For example, the first, second and transverse coils could all be connected in series with each other and connected to the same rectifier. In another example, the first, second and transverse coils could each be connected to separate rectifiers.

The transfer assembly 130 may also be provided with phase-delay components to provide a control or reduce phase differences between current received in the coils 140, 142, 144. In these examples, a single rectifier may be used to rectify current received in the coils 140, 142, 144 even if current is received with different polarity relationships. The phase delay components may include analog components such as capacitors and inductors or digital components such as integrated circuits or microcontrollers.

Figure 11:
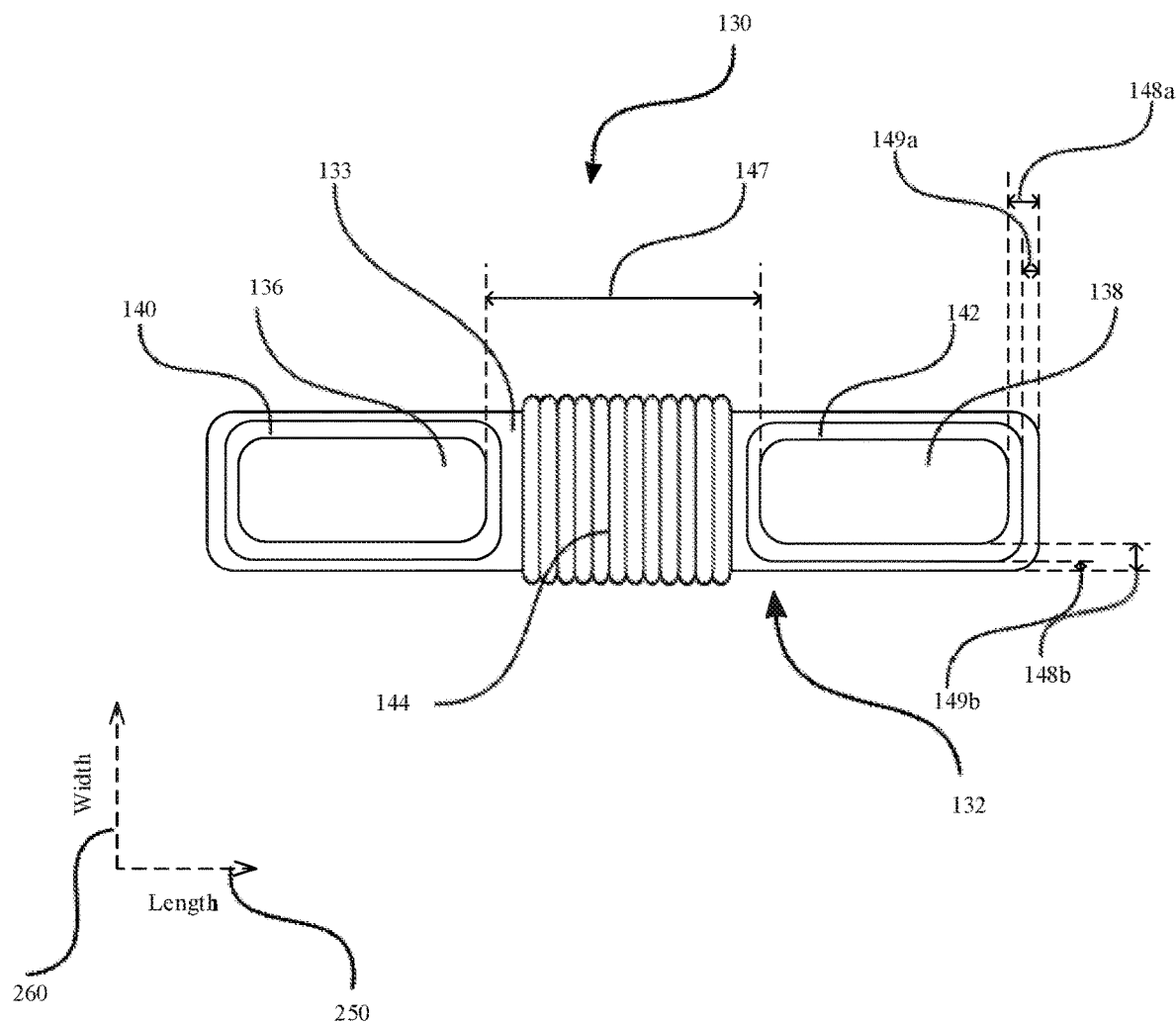
FIG. 11 is a top view of an illustrative inductive power receiving device showing the core, limbs and coils.
Figure 12:
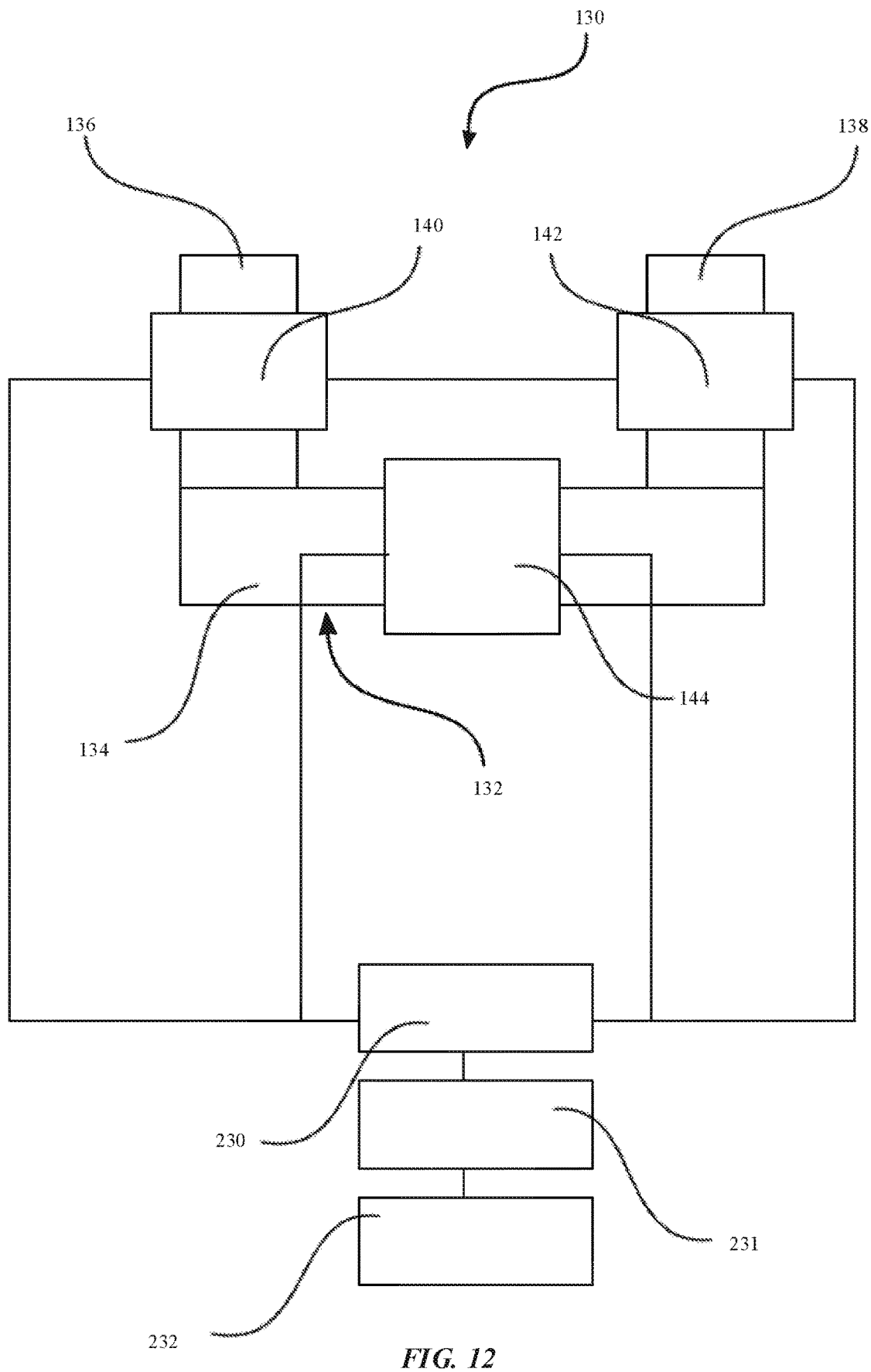
FIG. 12 is a schematic view of an illustrative inductive power receiver circuit.

FIG. 11 is one example of a receiving device showing the electrical connection of the coils 140, 142 to wireless power receiving circuitry. In this example, the power receiving circuitry includes a rectifier 230, a regulator 231 and a load 232.

In one example configuration, the first and second coils 140, 142 are connected in series electrically. In this example, the coils are wound in opposing directions—i.e. clockwise and counter-clockwise—such that the first and second coils 140, 142 may receive flux of opposing polarity and produce current that is in phase. The transverse coil 144 is connected in parallel to the first and second coils 140, 142 and wound in a direction such that current produced by the transverse coil 144 will be in phase with the current produced by the first and second coils 140, 142.

The first, second and transverse coils 140, 142, 144 are connected to rectifier 230 that converts the received alternating current into direct current. DC current from the rectifier is then provided to regulator 231 which controls the level of power provided to load 232.

It will be appreciated that the conductor may be a single-strand conductor, a multiple strand conductor having multiple wires connected in parallel, braided wire such as Litz wire, a conductive ink or conductive trace, or other conductive element suitable for forming coils.

In some examples, the first and second coils 140, 142 are comprised of between 10 and 50 turns, between 20 and 40 turns, between 25 and 35 turns, or approximately 29 turns. In some examples, the first and second coils are comprised of between 1 and 7 layers, between 2 and 5 layers, or 3 layers.

In some examples, the first and second coils 140, 142 have the same number of turns as each other.

In some examples, the transverse coil 144 is comprised of between 18 and 100 turns, between 24 and 55 turns, between 30 and 38 turns, or approximately 33 turns. In some examples, the transverse coil is comprised of between 1 and 7 layers, between 2 and 5 layers, or 3 layers. The transverse coil may be between 1 mm and 20 mm in length, between 2 mm and 10 mm in length, between 3 mm and 5 mm in length, or approximately 3.6 mm in length.

The winding ratio between either or each of the first and second coils 140, 142 to the transverse coil 144 mat be between 1:10 and 3:1, between 1:2 and 3:2, between 5:8 and 7:5, or approximately 29:33.

The transverse coil 144 can be a solenoid coil in which the length of the coil is greater than the diameter of the coil.

In some examples, the first and second coils 140, 142 extend in the width direction 260 between 1 mm and 10 mm, between 2 mm and 7 mm, between 2.7 mm and 5 mm, or approximately 3.6 mm.

In some examples, the first and second coils 140, 142 each extend in the length direction 250 between 2 mm and 15 mm, between 4 mm and 11 mm, between 5.5 mm and 8 mm, or approximately 6.3 mm.

In some examples, the first and second coils 140, 142 each extend in the height direction 270 between 0.5 mm and 4 mm, between 0.9 mm and 3 mm, between 1.5 mm and 2.5 mm, or approximately 2 mm.

In some examples the transverse coil 144 extends in the length direction between 1 mm and 10 mm, between 2.5 mm and 7 mm, between 2.8 mm and 5 mm, or approximately 3.3 mm.

The ratio of the extension in the length direction of the transverse coil to either of the first and second coils may be between be 1:2 and 2:1, or approximately 11:21.

In some examples, the inductive power transfer assembly 130 may not include a transverse coil.

Each coil may be wound onto carrier, such as a bobbin or former, before being placed on the core 132. Alternatively, each coil may be applied directly to the core 132.

The coils 140, 142, 144 may be arranged to couple to coils of an inductive power transmitting device. The coils 140, 142, 144 may be located, oriented or sized to couple to coils of the inductive power transmitting device. For example, the coils 140, 142 can be wound about limbs 136, 138 that are spaced a distance 147 apart to at least partially align with limbs and coils of an inductive power transmitting device that power is to be received from. This may enable flux generated by coils of the power transmitting device to efficiently couple into coils of receiving assembly 130.

The limbs 136, 138 may be spaced apart in the length direction by a distance 147 that is greater than the spacing of the limbs of an inductive power transmitting device. The distance 147 may be between 1.5 mm and 10 mm, between 3 mm and 7.5 mm, between 4 mm and 5.5 mm, or approximately 4.5 mm.

The distance 147 between the first and second limbs 136, 138 has an effect on the coupling between the power transfer assembly 130 and an inductive power transmitter. Smaller distances may result in higher maximum coupling (when the transfer assembly 130 and transmitter are optimally aligned) than larger distances. However, transfer assemblies with smaller distances between the first and second limbs may be more sensitive to misalignment, such that the amount of power transferred from a transmitter to the assembly decreases more quickly with increasing misalignment than it does for transfer assemblies with larger distances between limbs.

The distance 147 can be selected based at least partly on the degree of misalignment expected between the assembly 130 and an inductive power transmitter in use. In some examples, a misalignment of approximately +/−2 mm along either or both of the length and width axes 250, 260 may be expected in use.

The distance 147 can be selected based at least partly on properties of a charging device intended to provide power to the assembly 130. For example, the distance can be selected based on the size or separation of transmitter coils of a charging mat.

The distance 147 can be between 5% and 60% of the length of the base, between 10% and 50% of the length of the base, between 20% and 40% of the length of the base, or approximately 30% of the length of the base.

In some examples, the core 132 may not include first and second limbs or first and second coils. In these examples, the assembly 130 includes a substantially flat core 132 with a transverse coil wound about the core 132. These assemblies may be easier to manufacture than assemblies with first and second limbs and first and second coils.

The base 134 of the magnetic core 132 can be elongate, having one long axis, the "length" 250 and two shorter axes, the "width" 260 and "height" 270. The length axis 250 and the width axis 260 of the base can form a substantially planar front surface 133 from which the first and second limbs 136, 138 extend. The first and second limbs 136, 138 can be spaced from each other along the length axis 250.

The length of the core 132 may be between 5 mm and 50 mm, between 10 mm and 35 mm, between 15 mm and 25 mm, or approximately 17.5 mm. The width of the core may be between 1.2 mm and 12 mm, between 2.5 mm and 9 mm, between 3.8 mm and 6 mm, or approximately 4.5 mm. The height of the core may be between 1 mm and 10 mm, between 2 mm and 7 mm, between 2.8 mm and 5 mm, or approximately 3.4 mm.

The extension of the first and second limbs 136, 138 along the length axis 250 may be between 1 mm and 20 mm, between 3 mm and 12 mm, between 4.2 mm and 8 mm, or approximately 5 mm. The extension of the first and second limbs 116, 118 along the width axis 260 may be between 1 mm and 10 mm, between 2 mm and 7 mm, between 2.5 mm and 5 mm, or approximately 3.4 mm. The extension of the first and second limbs 116, 118 along the height axis 270 may be between 0.5 mm and 20 mm, between 1.2 mm and 10 mm, between 1.8 mm and 5 mm, or approximately 2 mm.

The length of the base 134 may be between 5 mm and 50 mm, between 10 mm and 35 mm, between 15 mm and 25 mm, or approximately 17.5 mm. The width of the base 134 may be between 1 mm and 15 mm, between 3 mm and 8 mm, between 4 mm and 6 mm, or approximately 4.5 mm. The height of the base 134 may be between 0.1 mm and 15 mm, between 0.8 mm and 5 mm, between 1.1 mm and 2 mm, or approximately 1.35 mm.

The base 134 may be between 1 and 50 times as long as it is wide, between 2 and 30 times as long as it is wide, between 3 and 10 times as long as it is wide, or approximately 4 times as long as it is wide.

The ratio of the extension along the length axis 250 of the base 134 to either of the first and second limbs 136, 138 may be between 20:1 and 20:9, 20:3 and 20:8, 20:5 and 20:6, or approximately 7:2. In other words, the limbs 136, 138 may each be between 5% and 45% the length of the base, between 15% and 40% the length of the base, between 25% and 30% the length of the base, or approximately 29% the length of the base.

The inductive power transfer assembly core 132 may be the same length as the core of the transmitting device. The inductive power transfer assembly core 132 may be shorter than the core of an inductive power transmitting device.

Figure 8:
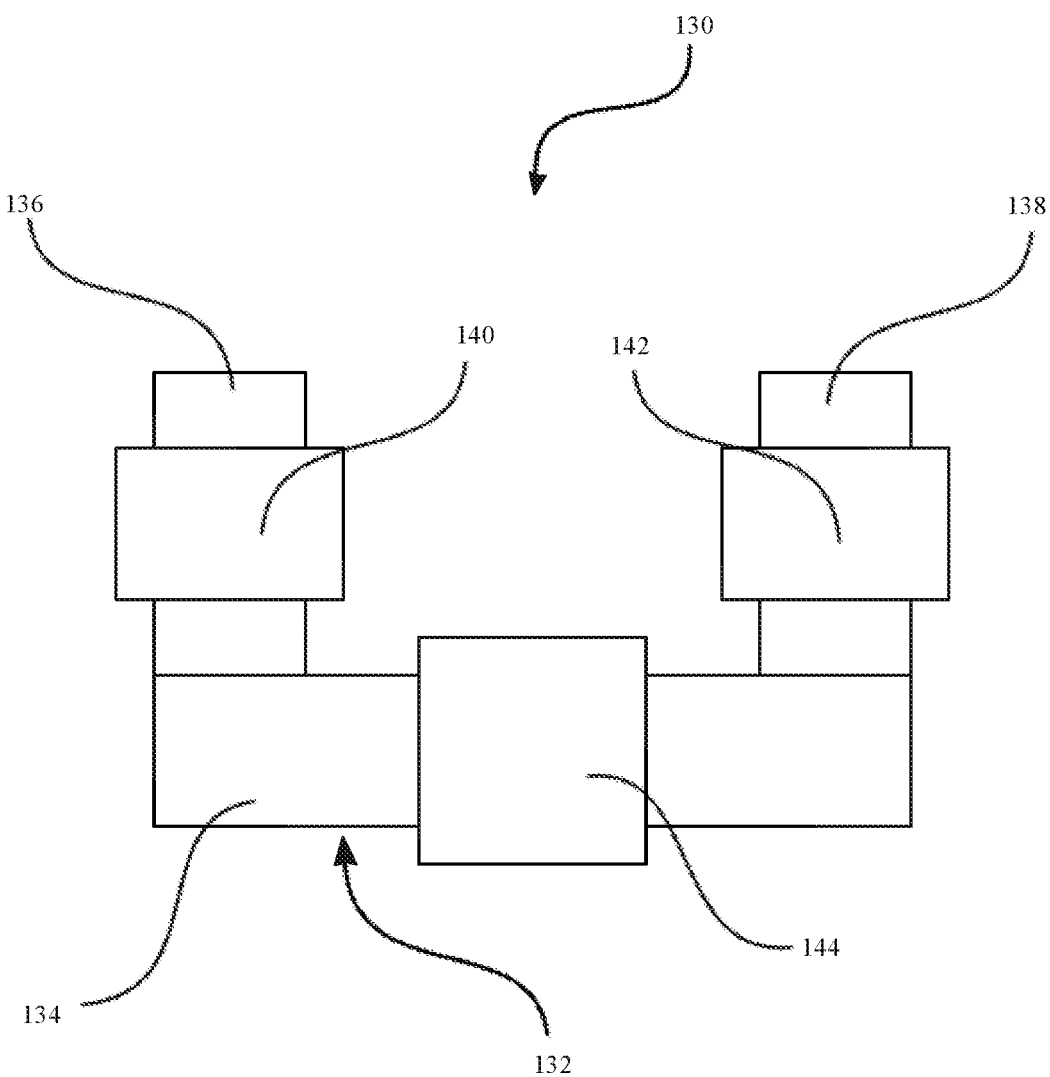
FIG. 8. is a schematic diagram of an illustrative inductive power transfer assembly with a core and coils in accordance with an embodiment.
Figure 9:
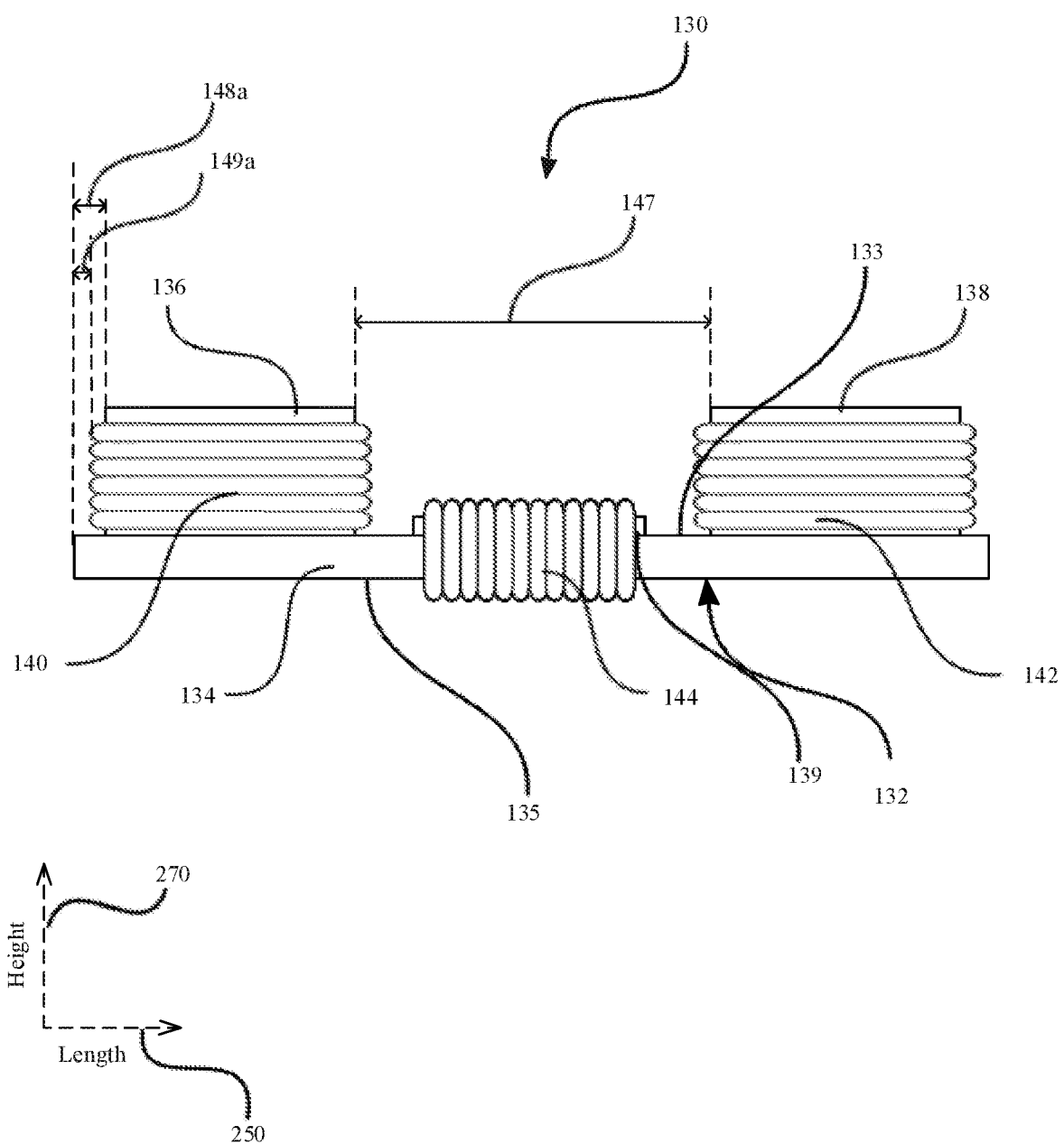
FIG. 9 is a side view of an illustrative inductive power receiving device with a base, first and second limbs, first and second coils and a transverse coil in accordance with an embodiment.
Figure 10:
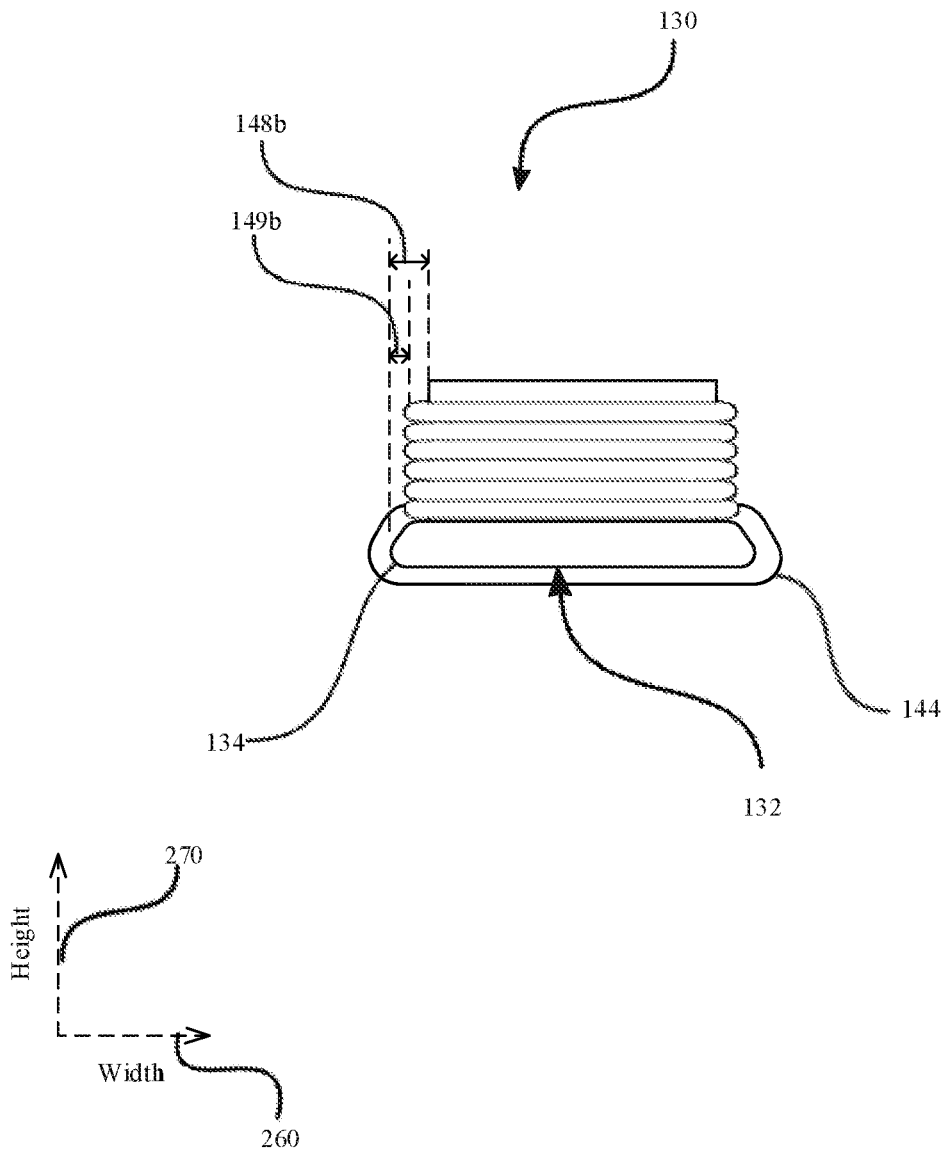
FIG. 10 is an end view of an illustrative inductive power receiving device showing the base, one of the limbs and one of the first and second coils and the transverse coil in accordance with an embodiment.

The first and second limbs 136, 138 may be inset from the perimeter of the planar surface of the base 134. This is shown in FIG. 8-10. In the side view of FIG. 8, the first and second limbs are inset from the perimeter of the base 134 in the length direction 250 as indicated at 148a. In the end view of FIG. 9, the first and second limbs are inset from the perimeter of the base 134 in the width direction 260 as indicated at 148b. The top view of FIG. 10 shows the insets 148a, 148b of the limbs 136, 138 in both the width 260 and length 250 directions. The limbs may be inset by the same amount. Alternatively, the inset in one direction may be greater than the inset in the other direction.

The insets 148a, 148b may be such that the base extends further in the width and/or length directions than the first and second limbs 136, 138 by 1%, 5% or 10%. In some examples, the insets may each be between 0 mm and 10 mm, between 0.3 mm and 6 mm, between 0.6 and 3 mm, or approximately 1.5 mm.

The inset of the limbs reduces the overall length and width of the assembly when the first and second coils are wound onto the limbs and can reduce fringing of the magnetic field to the sides and back 135 of the transfer assembly.

The first and second coils 140, 142 may be wound onto the first and second limbs 136, 138 such that the coils 140, 142 are inset from the perimeter of the planar surface of the base 134. This is shown in FIG. 8-10. In the side view of FIG. 8, the first and second coils are inset from the perimeter of the base 134 in the length direction 250 as indicated at 149a. In the end view of FIG. 9, the first and second coils are inset from the perimeter of the base 134 in the width direction 260 as indicated at 149b. The top view of FIG. 10 shows the insets 149a, 149b of the first and second coils 140, 142 in both the width 260 and length 250 directions. The coils may be inset by the same amount. Alternatively, the inset in one direction may be greater than the inset in the other direction.

The insets 149a, 149b may be such that the base extends further in the width and/or length directions than the first and second coils 140, 142 by 1%, 5% or 10%. In some examples, the insets may each be between 0 mm and 5 mm, between 0.2 mm and 3 mm, between 0.3 and 1 mm, or approximately 0.5 mm.

The insets 149a, 149b of the first and second coils described above mean that the base 134 of the core 132 extends out from the coils 140, 142 in the width 260 and length 250 directions, which may help reduce fringing of the magnetic field to the sides and back 135 of the transfer assembly 130—i.e. in directions other than the direction of extension of the first and second limbs 136, 138.

The first and second limbs 136, 138 may be the same size and shape as each other.

The base 134 of the core 132 may taper along the height direction 270 such that the back surface 135 of the base 134 extends further in the width direction 260 than the front surface 133 of the base 134 does. This can be seen in the end view of FIG. 9. This may allow the assembly to be located in small or irregular areas or compartments. For example, in a compartment with angled or rounded sides, such as in the interior of an electronic pencil or stylus, the tapered base 134 of the core allows it to be inserted deeper into a compartment such that the ends of the limbs 136, 138 are closer to the perimeter of the electronic pencil or stylus.

The first and second limbs 136, 138 of the transfer assembly 130 may each extend as far in the length direction 250 as each of the first and second limbs of a transmitting device.

The first and second limbs 136, 138 of the transfer assembly 130 may be shorter in the length direction 250 than each of the first and second limbs of a transmitting device. In other words, at least a portion of each of the first and second limbs, of the transmitting device have a greater length along the length axis 250 than each of the first and second limbs 136, 138 of the transfer assembly 130. This provides more space between the first and second limbs for the transverse coil 144 to be located.

The first and second limbs 136, 138 may have a varying extension in the length direction 250. For example, the limbs 136, 138 may have a shorter extension in the length direction 250 near the base 134 of the core than they do at their distal ends. This may provide more space between the first and second limbs 136, 138 for the transverse coil 144 to be located while still providing a relatively large surface facing a transmitter device.

The first and second limbs 136, 138 may both extend in a direction substantially orthogonal to the planar front surface 133 of the base 132—i.e. in the "height" direction 270. For example the limbs 136, 138 may extend at an angle of up to 30 degrees to the normal of the planar front surface 133 of the base 134; up to 15 degrees to the normal of the planar front surface 133 of the base 134; up to 5 degrees to the normal of the planar front surface 133 of the base 134; or approximately 0 degrees to the normal of the planar front surface 133 of the base 134.

The relatively short extension of the core 132 in the height 270 and width 260 directions results in an elongate transfer assembly 130 that can be installed in small compartments, housings or devices.

For example, the transfer assembly 130 may be installed and mounted in an electronic accessory such as an electronic pencil or stylus. These accessories are elongate and narrow, which requires a receiving device to have a correspondingly small cross section to fit in the accessory. The transfer assembly may be installed or form part of other wireless power receiving devices.

The core 132 may also include a third limb 137 located centrally between the first and second limbs 136, 138. The third limb 137 extends away from the front surface 133 of the core 132. The third limb 137 may be substantially parallel to one or both of the first and second limbs 136, 138.

The transverse coil 144 may be wound about the third limb 137 and the base 134. The third limb 137 may improve coupling of the assembly when the assembly is not optimally aligned with a transmitting device or when used on a charging surface of a charging mat. When the core includes a third limb, it may be advantageous to wind the first and second coils 140, 142 on a bobbin or former before applying them to the first and second limbs 136, 138 due to the space taken up by the third limb, which may make winding the coils directly onto the first and second limbs 136, 138 more difficult.

As shown in the top view of FIG. 10, the corners of the base 134 may be rounded. This may provide improved guiding and shaping of the magnetic field and reduce leakage flux.

The core 132 is made of magnetically permeable material. For example, the core 132 may be ferrite, iron, mild steel, mu-metal or other magnetic materials. The core 132 may be a single piece or made from separate pieces. The core may be moulded, sintered, laminated or manufactured by other processes.

The inductive power transfer assembly 130 may be provided within an electronic accessory such as an electronic pencil or stylus. In one example, the accessory or other receiving device can be configured to be placed in a charging zone of an electronic device such as a laptop or tablet computer or mobile phone.

In some cases, the accessory may be placed on a charging surface of a charging mat to receive power wirelessly. Generally, precise alignment of the transfer assembly with transmitting devices—e.g. coils or cores—of the charging mat is less likely to be achieved when placing a receiving device on a charging mat. This means that the first and second coils 140, 142 of the assembly 130 may not receive power as efficiently as they would if they were precisely aligned and/oriented with a transmitting device.

The transfer assembly 130 or electronic accessory or other wireless power receiving device may be configured to be retained in a particular position and/or orientation with respect to a wireless power transmitting device. For example, the assembly, accessory or device can include magnets for coupling with magnetic materials of the wireless power transmitting device in a particular position or orientation. The accessory or device could have a flat surface to provide the accessory or device with a preferred orientation when resting on a flat surface such as the exterior of an electronic device or the charging surface of a wireless power charging mat, or markings or other assistance to alignment.

The transfer assembly 130 may be provided in a compartment of the accessory or other device and the compartment may have a partial electromagnetic shield or plating to shield electronics of the accessory or other device from the charging field. The shield or plating may be made of copper or another suitable shielding material. The base 134 of the core 132 can extend across the width of the compartment.

Figure 16:
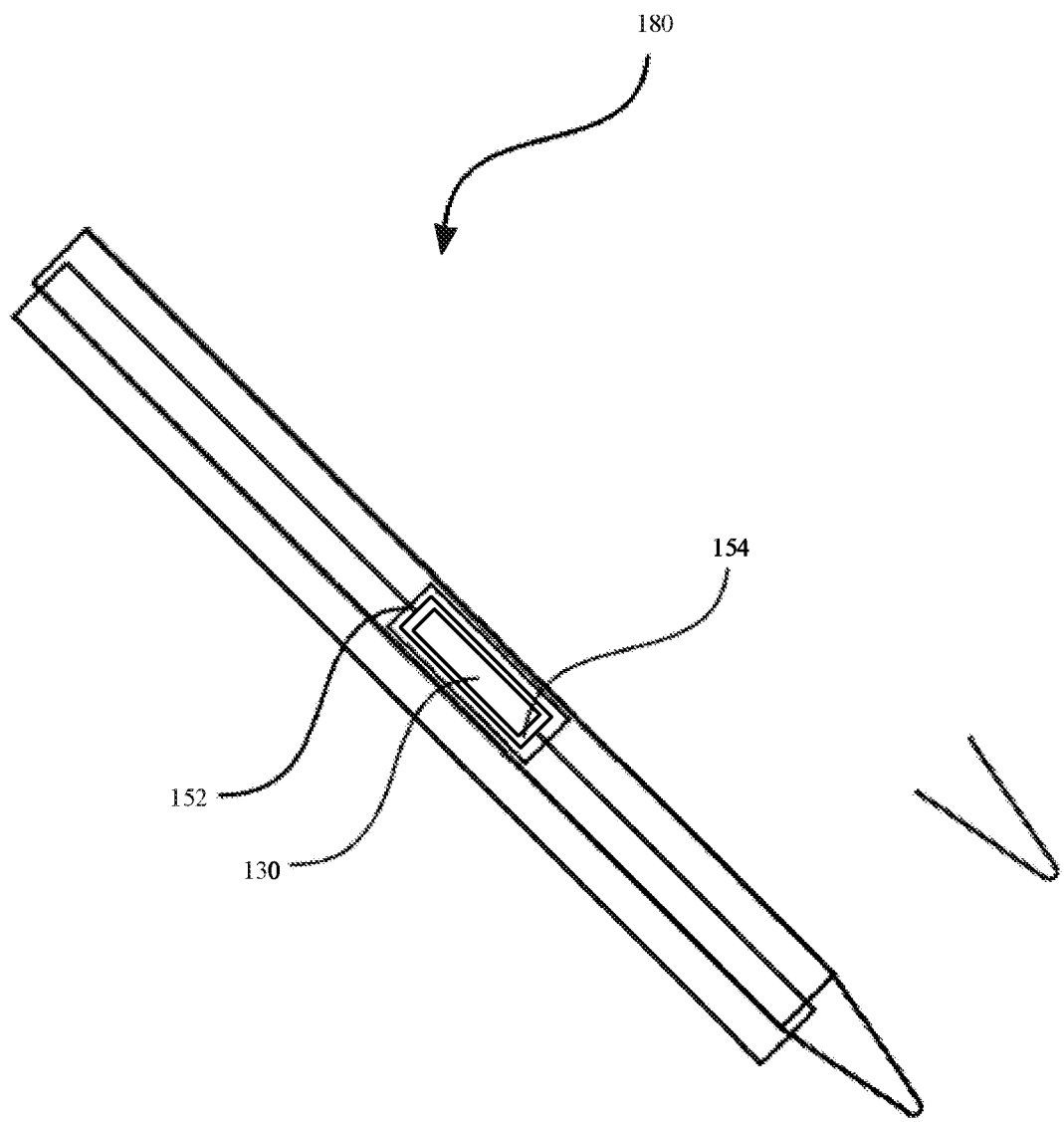
FIG. 16 is a schematic diagram of an illustrative electronic accessory including an inductive power receiving device in accordance with an embodiment.

FIG. 16 is an illustrative embodiment of an electronic accessory including an inductive power transfer assembly 130. In this case, the electronic accessory is an electronic pencil or stylus 180. The inductive power transfer assembly 130 is shown within a compartment 152 of the accessory. The compartment 152 or the transfer assembly includes a partial shield or plating 154. The accessory can be placed in a charging zone of a wireless power transmitting device or on a charging surface of a wireless charging mat to receive power wirelessly via the inductive power transfer assembly 130.

Figure 13:
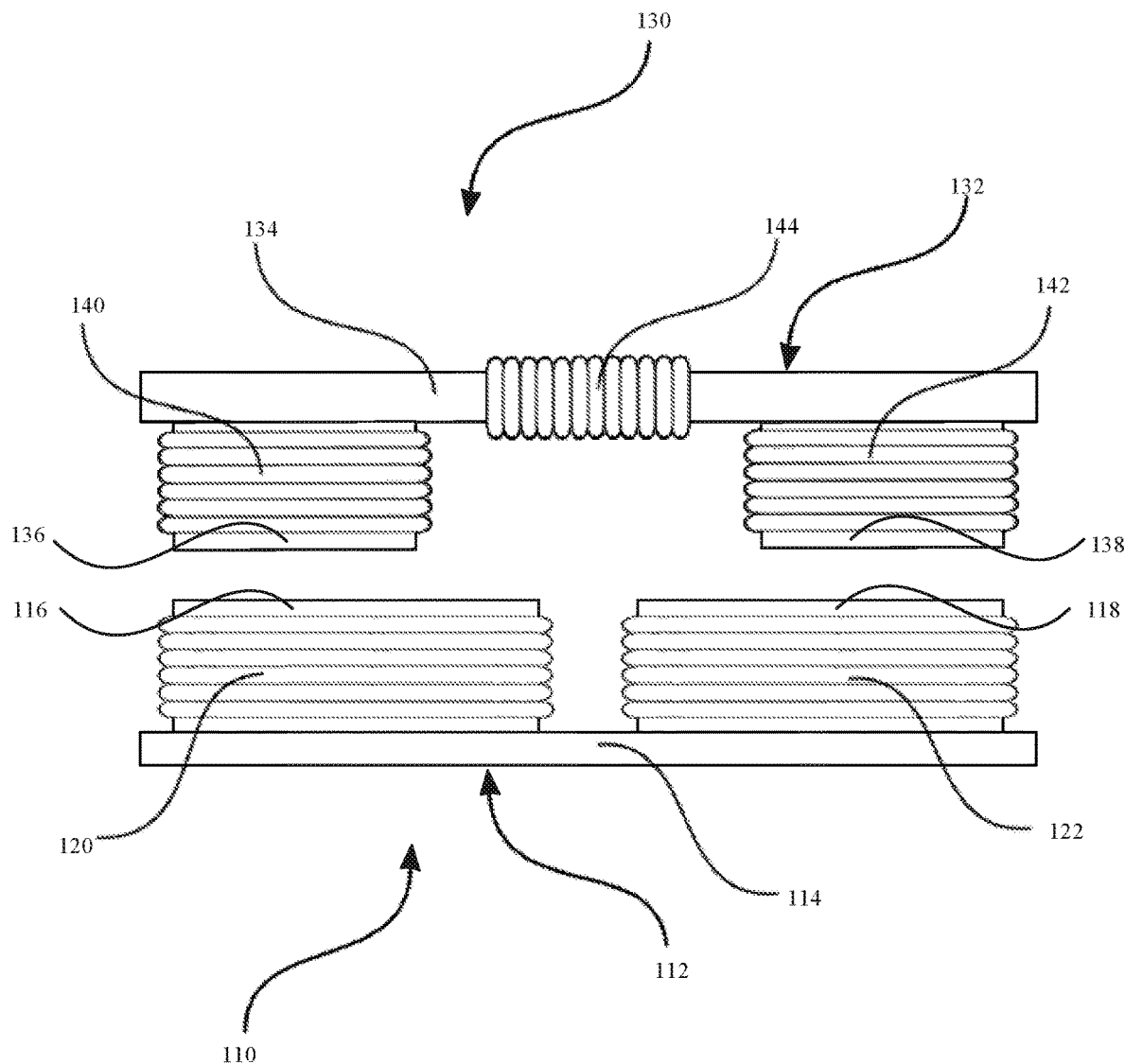
FIG. 13 is a side view of an illustrative inductive power transfer system showing an illustrative inductive power transmitting assembly and an illustrative inductive power receiving assembly in accordance with an embodiment.

The inductive power transfer assemblies 110, 130 may be operated as an inductive power transmitting device 110 and an inductive power receiving device 130, respectively. The inductive power transfer assemblies 110, 130 may be designed to couple to each other to provide good inductive coupling with low levels of leakage of magnetic flux. As shown in FIG. 13, the transmitting device 110 and receiving device 130 can be oriented face to face with the first and second limbs 116, 118 of the transmitting device 110 aligned with the first and second limbs 136, 138 of the receiving device 130. The ends of the first and second limbs 116, 118 of the transmitting device 110 are also located proximate the ends of the first and second limbs 136, 138 of the receiving device 130. In this arrangement, the cores 112, 132 of the transmitting device 110 and receiving device 130 provide a low-reluctance loop for the magnetic flux generated by the transmitter coils 120, 122.

In use, the inverter 124 energizes the first and second coils 120, 122 of the transmitting device 110 to generate magnetic flux of opposing polarities. The flux path is directed outwards from a first limb (e.g. 116) of the transmitting device 110, inwards to a first limb (e.g. 136) of the receiving device 130, through the base 134 of the receiving device 130, outwards from a second limb (e.g. 138) of the receiving device 130, inwards to a second limb (e.g. 118) of the transmitting device 110 and through the base 114 of the transmitting device 110 back to the first limb 116 of the transmitting device. It will be appreciated that the direction of this flux path depends on the instantaneous phase of current through the coils of the transmitting device.

The alignment and close proximity of the ends of the first and second limbs 116, 118; 136, 138 of the transmitting device 110 and receiving device 130 provide good coupling of the magnetic flux generated by the coils 120, 122 of the transmitting device to the receiving device 130. This allows the first, second and transverse coils 140, 142, 144 to efficiently receive power from the changing flux passing through the coils.

It will be appreciated that the system of FIG. 13 can be comprised of any combination of the illustrative power transfer assemblies 110, 130 described herein. For example, the system could include a power transfer assembly 110 with or without a transverse coil 117 operating as a power transmitting device and a power transfer assembly 130 with or without a transverse coil 144 operating as a power receiving device.

The foregoing is merely illustrative and various modifications can be made to the described embodiments. The foregoing embodiments may be implemented individually or in any combination, and elements from one embodiment may be combined with others.

What is claimed is:

1. An inductive power transfer assembly comprising:
   a magnetic core having a base portion, a first limb, and a second limb, wherein the first limb and the second limb extend, in a direction, from a surface of the base portion;
   a first power transfer coil and a second power transfer coil, wherein the first power transfer coil is wound about the first limb, and wherein the second power transfer coil is wound about the second limb; and
   inverter circuitry connected to the first power transfer coil and the second power transfer coil, wherein the inverter circuitry, during operation, causes the first power transfer coil and the second power transfer coil to generate flux having opposing polarity.

2. The inductive power transfer assembly of claim 1, wherein the flux generated by the first power transfer coil and the second power transfer coil during operation produces a directional flux field, wherein the directional flux field is directed away from the base portion, along the direction of extension of the first limb and the second limb.

3. The inductive power transfer assembly of claim 1, wherein the first limb extends from the surface of the base portion along an axis, and wherein the first power transfer coil is wound about the limb circumferentially along the axis.

4. The inductive power transfer assembly of claim 3, wherein the axis is normal to the surface of the base portion of the magnetic core.

5. The inductive power transfer assembly of claim 4, wherein the first limb and second limb extend from a flat portion of the base portion of the magnetic core.

6. The inductive power transfer assembly of claim 1, wherein the first limb and the second limb have the same size and shape.

7. The inductive power transfer assembly in claim 1 wherein the coils are arranged to couple to an inductive power receiver.

8. The inductive power transfer assembly in claim 1 wherein the base having a width wider that a width of the coils.

9. The inductive power transfer assembly in claim 8 wherein the base is 1/%, 5% or 10% wider that the coils.

10. The inductive power transfer assembly in claim 1 wherein the limbs being substantially inset from the base.

11. The inductive power transfer assembly in claim 1 wherein the base is between 0.4 mm and 2 mm in height, the limbs are between 1.8 mm and 5 mm in height.

12. The inductive power transfer assembly in claim 1 wherein the coils include between 15 and 30 turns and are 2 layers.

13. The inductive power transfer assembly in claim 1 further comprising a partial copper electromagnetic shield or copper plating.

14. The inductive power transmitter in claim 1 wherein the core is a moulded ferrite core.

15. An inductive power transfer assembly comprising:
a magnetic core having a base portion, a first limb and a second limb, wherein the first limb and the second limb extend, in a direction, from a surface of the base portion;
a first power transfer coil and a second power transfer coil, wherein the first power transfer coil is wound about the first limb, and wherein the second power transfer coil is wound about the second limb; and
a transverse power transfer coil, wherein the transverse power transfer coil is wound about the base portion.

16. The inductive power transfer assembly in claim 15 further comprising a converter connected to the two power receiving coils and receiving current from each coil with opposing polarity.

17. The inductive power transfer assembly of claim 16, wherein the current received from each coil is derived from flux received in the respective limb about which the coil is wound.

18. The inductive power transfer assembly in claim 15 wherein the two power transfer coils are arranged to couple to a first type of inductive power transmitter and the transverse power transfer coil is arranged to couple to a second type of inductive power transmitter.

19. The inductive power transfer assembly in claim 18 wherein the base being substantially similar in length to a base of the first type of inductive power transmitter.

20. The inductive power transfer assembly in claim 15 wherein the core further comprising a central limb.

21. The inductive power transfer assembly in claim 20 wherein the transverse power transfer coil is provided around the central limb and the base.

22. The inductive power transfer assembly in claim 15 wherein the base is between 1-50, 2-30, or 3-10 times as long as it is wide.

23. The inductive power transfer assembly in claim 15 mounted within an associated wirelessly rechargeable stylus.

24. The inductive power transfer assembly in claim 23 wherein the assembly is mounted within a compartment in the stylus and the assembly further comprising a partial copper electromagnetic shield in the compartment or copper plating of the compartment or the stylus.

25. The inductive power transfer assembly in claim 15 wherein the limbs are each between 5-45%, 25-30% of the length of the base.

26. The inductive power transfer assembly in claim 15 wherein a space between the limbs is between 5-60%, 10-50% or 20-40% of the length of the base.

27. The inductive power transfer assembly in claim 15 wherein the base is between 1.1 mm and 2 mm in height, the limbs are between 1.8 mm and 5 mm in height.

28. The inductive power transfer assembly in claim 15 wherein the coils include between 20 and 40 turns and are 3 layers.

29. The inductive power transfer assembly in claim 15 wherein the core is a moulded ferrite core.

30. The inductive power transfer assembly in claim 15 wherein a winding ratio between each of the first and second power transfer coils and the transverse power transfer coil is between 1:10 and 3:1, between 1:2 and 3:2, between 5:8 and 7:5.

31. An inductive power transfer system comprising:
an inductive power transmitter assembly and an inductive power receiver assembly, the inductive power transmitter assembly comprising:
a magnetic core having a base portion, a first limb, and a second limb, wherein the first limb and the second limb extend, in a direction, from a surface of the base portion;
a first power transfer coil and a second power transfer coil, wherein the first power transfer coil is wound about the first limb, and wherein the second power transfer coil is wound about the second limb; and
inverter circuitry connected to the first power transfer coil and the second power transfer coil, wherein the inverter circuitry, during operation, causes the first power transfer coil and the second power transfer coil to generate flux having opposing polarity,
the inductive power receiver assembly comprising:
a magnetic core having a base portion, a first limb and a second limb, wherein the first limb and the second limb extend, in a direction, from a surface of the base portion;
a first power transfer coil and a second power transfer coil, wherein the first power transfer coil is wound about the first limb, and wherein the second power transfer coil is wound about the second limb; and
a transverse power transfer coil, wherein the transfer power transfer coil is wound about the base portion, and wherein the first limb and second limb of the transmitter and the first limb and second limb of the receiver are configured to be aligned with each other in use.

32. The inductive power transfer system in claim 31, wherein at least a portion of each of the first and second limbs of the transmitter assembly have a greater length along a long axis of the transmitter core than the length of each of the first and second limbs of the receiver assembly along a long axis of the receiver core.

* * * * *